(12) United States Patent
Phanco et al.

(10) Patent No.: US 6,971,234 B1
(45) Date of Patent: Dec. 6, 2005

(54) ZERO-TURN HYDROSTATIC TRANSAXLE

(75) Inventors: Eric S. Phanco, Decatur, IL (US); Kenneth J. Rawski, Sullivan, IL (US); Patricia J. Given, Cerro Gordo, IL (US); William H. Ward, Mahomet, IL (US); Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/902,619

(22) Filed: Jul. 29, 2004

Related U.S. Application Data

(63) Continuation of application No. 10/209,703, filed on Jul. 31, 2002, now Pat. No. 6,775,976.

(51) Int. Cl.[7] .............................................. F16D 31/02
(52) U.S. Cl. .............................. 60/484; 60/487; 92/146
(58) Field of Search ............................ 60/484, 485, 487, 60/488; 92/12.2, 146

(56) References Cited

U.S. PATENT DOCUMENTS

| | | | |
|---|---|---|---|
| 3,360,933 A | 1/1968 | Swanson et al. | |
| 4,167,855 A | 9/1979 | Knapp | |
| 4,809,796 A | 3/1989 | Yamaoka et al. | |
| 4,819,508 A | 4/1989 | Yamaoka et al. | |
| 4,856,368 A | 8/1989 | Fujisaki et al. | |
| 4,870,820 A | 10/1989 | Nemoto | |
| 4,899,541 A | 2/1990 | Okada et al. | |
| 4,905,472 A | 3/1990 | Okada | |
| 4,914,907 A | 4/1990 | Okada | |
| 4,932,209 A | 6/1990 | Okada et al. | |
| 4,986,073 A | 1/1991 | Okada | |
| 5,010,733 A | 4/1991 | Johnson | |
| 5,042,252 A | 8/1991 | Havens et al. | |
| 5,074,195 A | 12/1991 | Ohashi et al. | |
| 5,078,222 A | 1/1992 | Hauser et al. | |
| 5,094,077 A | 3/1992 | Okada | |
| 5,136,845 A | 8/1992 | Woodley | |
| 5,146,748 A | 9/1992 | Okada | |
| 5,163,293 A | 11/1992 | Azuma et al. | |
| 5,182,966 A | 2/1993 | von Kaler et al. | |
| 5,201,692 A | 4/1993 | Johnson et al. | |
| 5,289,738 A | 3/1994 | Szulczewski | |
| 5,311,740 A | 5/1994 | Shiba et al. | |
| 5,314,387 A | 5/1994 | Hauser et al. | |
| 5,333,451 A | 8/1994 | Sakikawa et al. | |
| 5,339,631 A | 8/1994 | Ohashi | |
| 5,373,697 A | 12/1994 | Jolliff et al. | |
| 5,440,951 A | 8/1995 | Okada et al. | |
| 5,461,941 A | 10/1995 | Young | |
| 5,546,752 A | 8/1996 | Horton et al. | |
| 5,555,727 A | 9/1996 | Hauser et al. | |
| 5,588,294 A | 12/1996 | Sakakura et al. | |
| 5,613,409 A | 3/1997 | Hauser | |
| 5,771,758 A | 6/1998 | Hauser | |

(Continued)

*Primary Examiner*—Edward K. Look
*Assistant Examiner*—Ogor Kershteyn
(74) *Attorney, Agent, or Firm*—Neal, Gerber & Eisenberg LLP

(57) ABSTRACT

A pair of zero-turn, hydrostatic transaxles (HZTs) that may be joined to form an integrated, zero-turn, hydrostatic transaxle. Each of the hydrostatic transaxles are further comprised of a casing carrying a hydraulic pump driven by an input shaft, a hydraulic motor driven by a the hydraulic pump through porting contained within a center section, and an axle shaft driven by the hydraulic motor. The hydrostatic transaxles are joined along an interface extending generally perpendicularly to the axle shafts.

15 Claims, 28 Drawing Sheets

U.S. PATENT DOCUMENTS

| | | | |
|---|---|---|---|
| 5,794,443 A | 8/1998 | Shimizu | |
| 5,836,159 A | 11/1998 | Shimizu et al. | |
| 5,950,500 A | 9/1999 | Okada et al. | |
| 5,957,229 A | 9/1999 | Ishii | |
| 6,098,740 A | 8/2000 | Abend et al. | |
| 6,122,996 A | 9/2000 | Hauser et al. | |
| 6,125,630 A | 10/2000 | Abend et al. | |
| 6,185,936 B1 | 2/2001 | Hauser et al. | |
| 6,256,989 B1 | 7/2001 | Hauser et al. | |
| 6,260,339 B1 | 7/2001 | Abend et al. | |
| 6,261,201 B1 | 7/2001 | Hauser et al. | |
| 6,283,235 B1 | 9/2001 | Sporrer et al. | |
| 6,314,730 B1 | 11/2001 | Shimizu | |
| 6,370,876 B1 | 4/2002 | Langenfeld | |
| 6,374,604 B1 | 4/2002 | Poplawski et al. | |
| 6,390,227 B1 | 5/2002 | Abend et al. | |
| 6,401,869 B1 | 6/2002 | Iida et al. | |
| 6,467,263 B2 | 10/2002 | Johnson et al. | |
| 6,467,265 B1 | 10/2002 | Abend | |
| 6,550,244 B1 | 4/2003 | Langenfeld | |
| 6,568,498 B2 | 5/2003 | Abend et al. | |
| 6,571,555 B2 * | 6/2003 | Abend et al. | 60/487 |
| 6,648,095 B2 | 11/2003 | Abend et al. | |
| 6,651,427 B1 | 11/2003 | Poplawski et al. | |
| 6,681,569 B1 | 1/2004 | Phanco et al. | |
| 6,705,080 B2 * | 3/2004 | Abend et al. | 60/487 |
| 6,745,864 B2 | 6/2004 | Abend et al. | |

* cited by examiner

ZERO-TURN HYDROSTATIC TRANSAXLE

CROSS-REFERENCE TO RELATED APPLICATION

This patent application is a continuation application of and claims priority from application Ser. No. 10/209,703, filed Jul. 31, 2002 now U.S. Pat. No. 6,775,976. This application is incorporated herein by reference in its entirety.

BACKGROUND OF THE INVENTION

This invention relates generally to hydrostatic transaxles.

Hydrostatic transaxles ("HSTs"), including integrated hydrostatic transaxles ("IHTs"), are known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the degree of axial movement depends upon the angular orientation of the swash plate. Axial movement of the pump pistons forces a hydraulic fluid through the porting, which forces the motor pistons against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor and the rotation of the hydraulic motor may be used to drive one or more axles of a riding lawn mower, small tractor, or the like.

Zero-turn, hydrostatic transaxles (HZTs) are also known in the art. Generally, an HZT is utilized in connection with a vehicle to provide for the independent control of each of the drive wheels of the vehicle. By way of example, HZTs are described in U.S. Pat. Nos. 5,078,222 and 6,283,235 which are incorporated herein by reference in their entirety. Additionally, Eaton has developed and marketed HZTs as their models 771 and 781. The Eaton model 771 is an assembly with one pump and one motor where two Eaton model 771 assemblies, a right and a left, are required for zero turn drive. The Eaton model 781 consists of two units similar to the Eaton model 771 but joined together to make one assembly.

SUMMARY OF THE INVENTION

A pair of zero-turn, hydrostatic transaxles (HZTs) that may be joined to form an integrated, zero-turn, hydrostatic transaxle. Each of the hydrostatic transaxles are further comprised of a casing carrying a hydraulic pump driven by an input shaft, a hydraulic motor driven by a the hydraulic pump through porting contained within a center section, and an axle shaft driven by the hydraulic motor. The hydrostatic transaxles are joined along an interface extending generally perpendicularly to the axle shafts.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
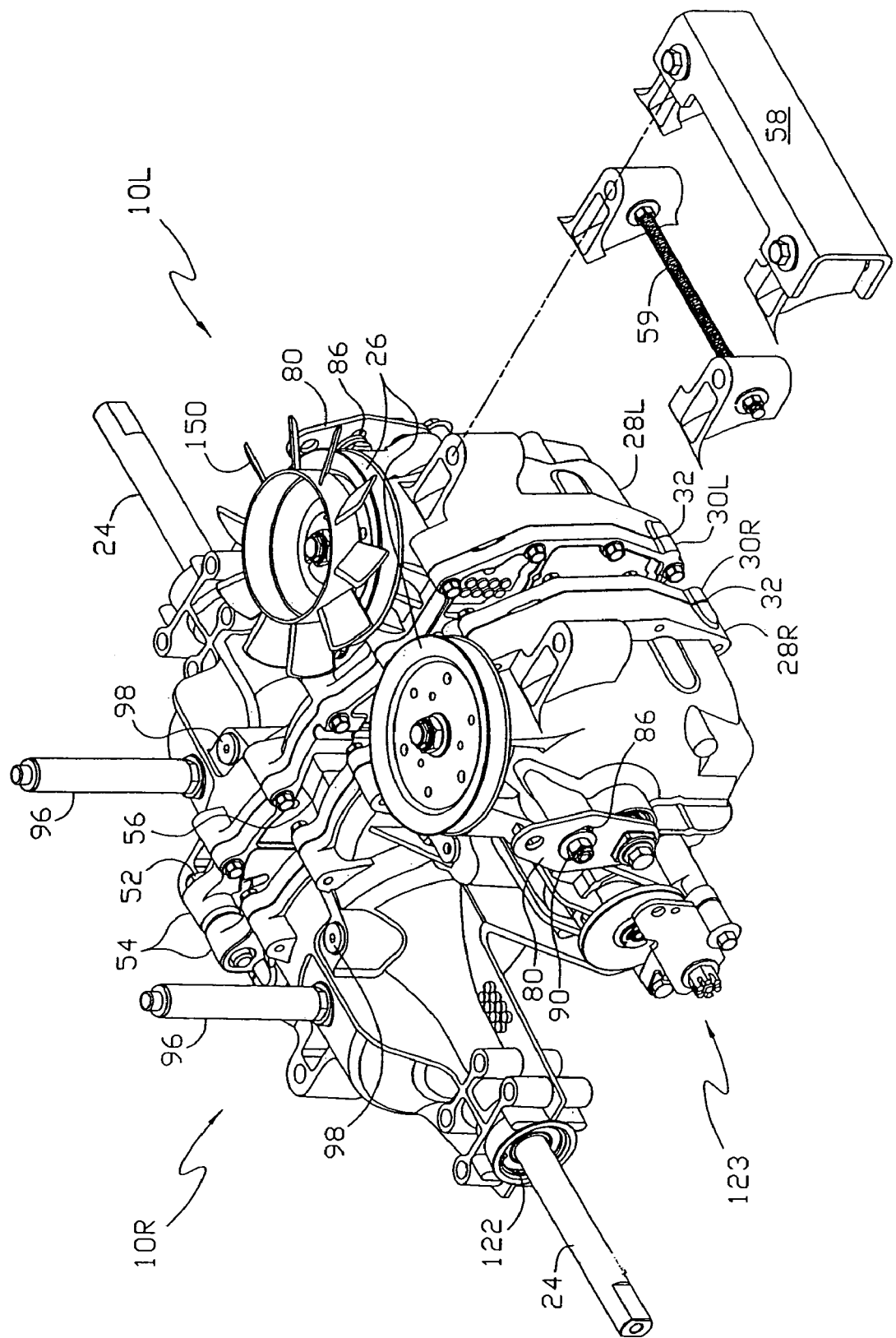
FIG. 1 illustrates a perspective view of an exemplary, integrated, zero-turn, hydrostatic transaxle constructed in accordance with the principles of the subject invention further illustrating an exemplary, outboard, disk brake mechanism and various casing attachment mechanisms.

Turning now to the figures, wherein like reference numerals refer to like elements, there is illustrated a zero-turn, hydrostatic transaxle generally used to drive a vehicle, such as a walk behind mover, snow thrower, riding mower, tractor, or other vehicle desiring a zero turn radius. As particularly illustrated in FIGS. 1–9, the zero-turn, hydrostatic transaxle is comprised of a pair of generally mirror image HZTs 10L and 10R that are each used to independently drive a single axle shaft 24. While the HZTs 10L and 10R can be used independently, the HZTs 10L and 10R may be adapted to be attached to one another in a manner described hereinafter to form an integrated, zero-turn, hydrostatic transaxle.

As will be understood by those of skill in the art, and as particularly illustrated in FIGS. 16–22, each HZT 10 generally operates on the principle of an input shaft 12 rotatably driving a hydraulic pump 14 which, through the action of its pump pistons 16, pushes hydraulic fluid to a hydraulic motor 18 through porting formed in a center section 20 to cause the rotation of the hydraulic motor 18. The rotation of the hydraulic motor 18 causes the rotation of a motor shaft 22 which rotation is eventually transferred through a gearing system or the like to drive the axle shaft 24. A motive force from, for example, an engine may be supplied directly to the input shaft 12 or indirectly by means of a pulley 26. For a more detailed description of the principles of operation of such a hydrostatic transaxle, the reader is referred to U.S. Pat. Nos. 5,201,692 and 6,122,996 which are incorporated herein by reference in their entirety.

To house these components, each HZT 10 is provided with a casing wherein the casings of each HZT 10L and 10R are generally mirror images of one another. In one embodiment, the casing is comprised of first casing members 28L and 28R and second casing members 30L and 30R (in the form of end caps) that are joined along a substantially vertical junction surface 32, as is illustrated in FIGS. 1–4. In this embodiment, for accepting fasteners 52, each of the HZTs 10 can be provided with a plurality of bosses 54 (illustrated as three by way of example only) having fastener accepting openings. The fasteners 52 are passed through the fastener accepting openings of adjacent bosses 54 (which may be formed in both the first and second casing sections or one of the casing sections alone) to mate the HZTs 10L and 10R to form the integrated unit. The casing of each HZT 10L and 10R can also be provided with a flat surface 56 that engages the flat surface 56 of the opposite HZT 10 to provide an additional point of contact between the HZTs 10. Thus, the individual HZTs 10L and 10R also may be joined along a substantially vertical junction surface to thereby form the integrated, zero-turn, hydrostatic transaxle assembly.

Figure 2:
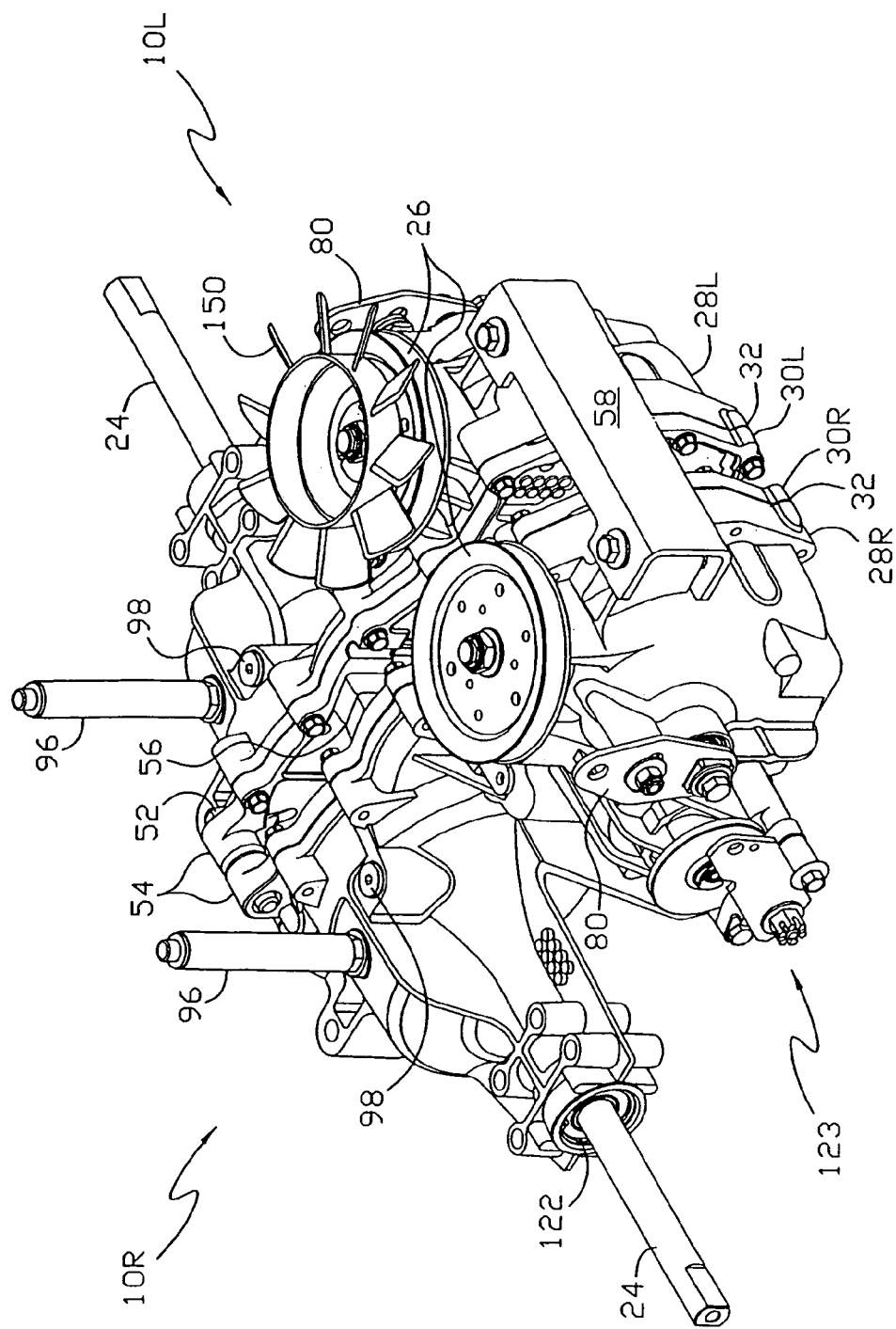
FIG. 2 illustrates a perspective view of the integrated, zero-turn hydrostatic transaxle of FIG. 1 with an exemplary bracket attachment mechanism.
Figure 3:
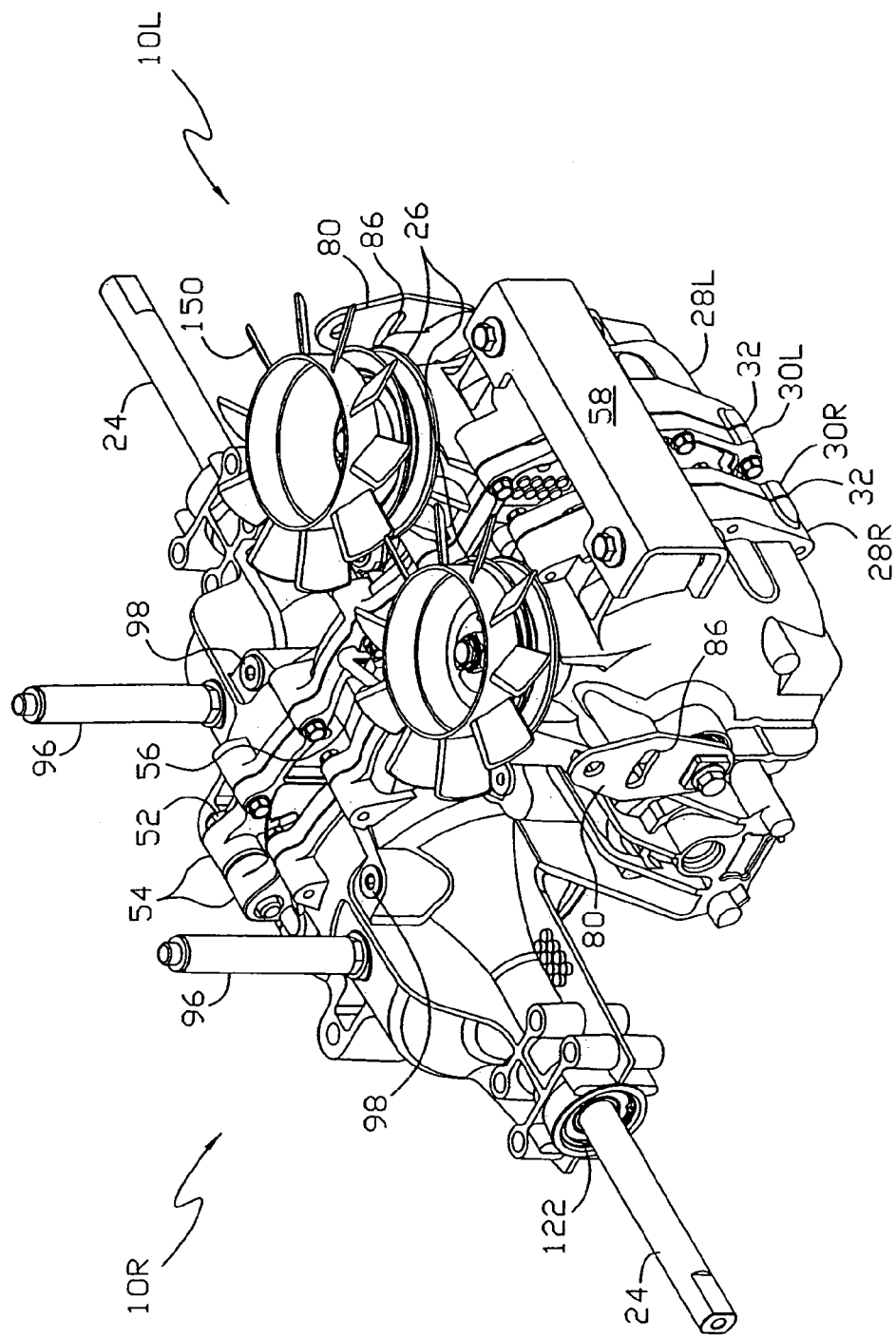
FIG. 3 illustrates a perspective view of the integrated, zero-turn hydrostatic transaxle of FIG. 1 with an exemplary, inboard, disk brake mechanism.
Figure 4:
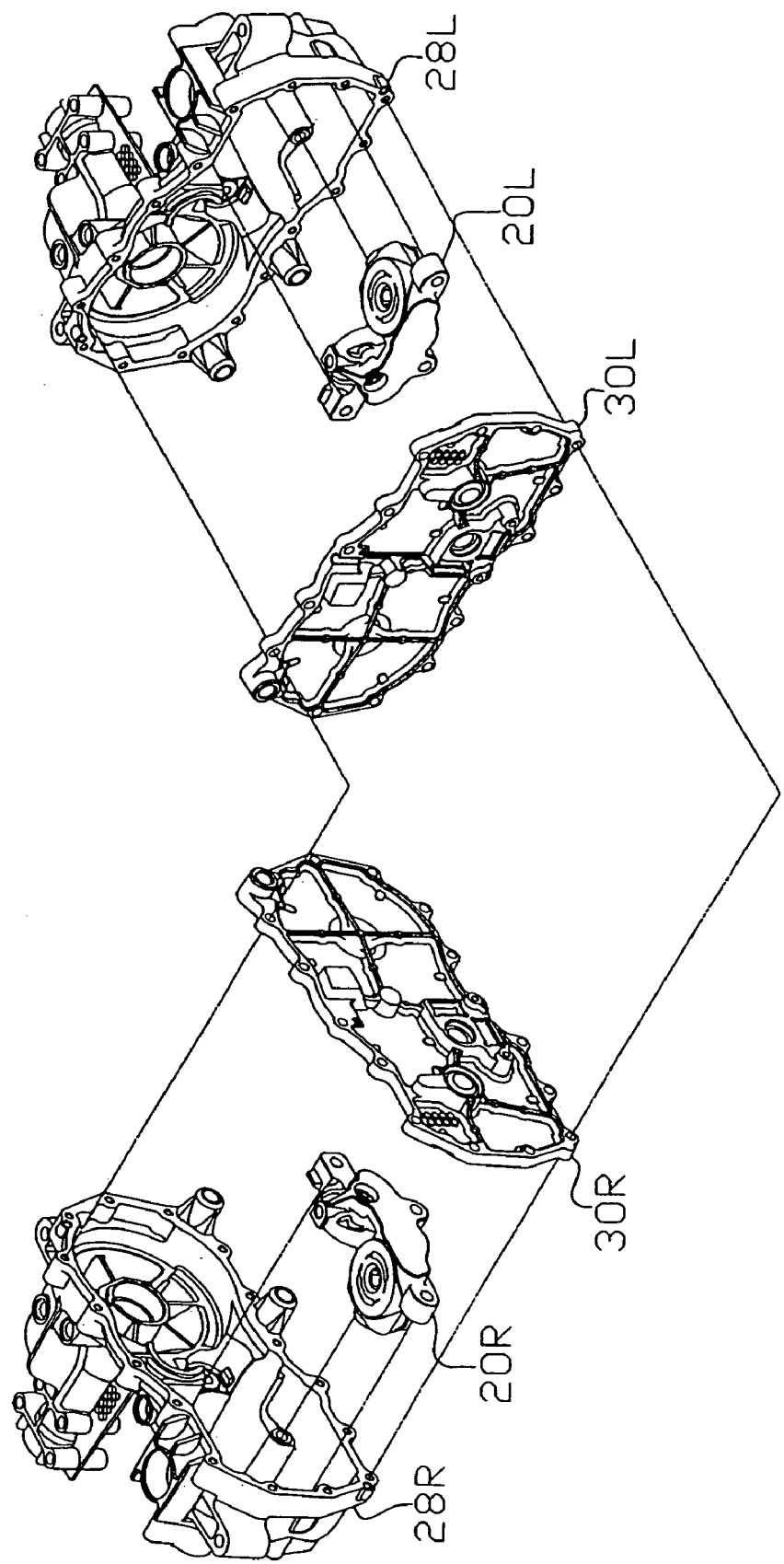
FIG. 4 illustrates an exploded view of exemplary casing members and center sections of the integrated, zero-turn hydrostatic transaxle of FIG. 1.

To maintain the attachment between the HZTs 10L and 10R, a bracket 58 may be fastened between each of the HZT casings as illustrated in FIGS. 1–3. For this same purpose and by way of further example, a rod 59 having opposing threads that are adapted to engage correspondingly threaded apertures formed in the casings of the HZTs 10 may be utilized. Still further, a threaded rod may pass through un-threaded openings in the casings and nuts may be threaded to the rod to maintain the attachment between the HZTs 10. In yet another configuration, one or more bosses on the front portions of the casings of the HZTs 10 may be fastened to a vehicle frame to resist torque induced by movement of the axle shafts 24 and maintain the orientation of the HZTs 10L and 10R with respect to one another. This fastening technique may be used alone or in conjunction with other fastening techniques such as the aforementioned bracket 58 or threaded rod 59.

Figure 6:
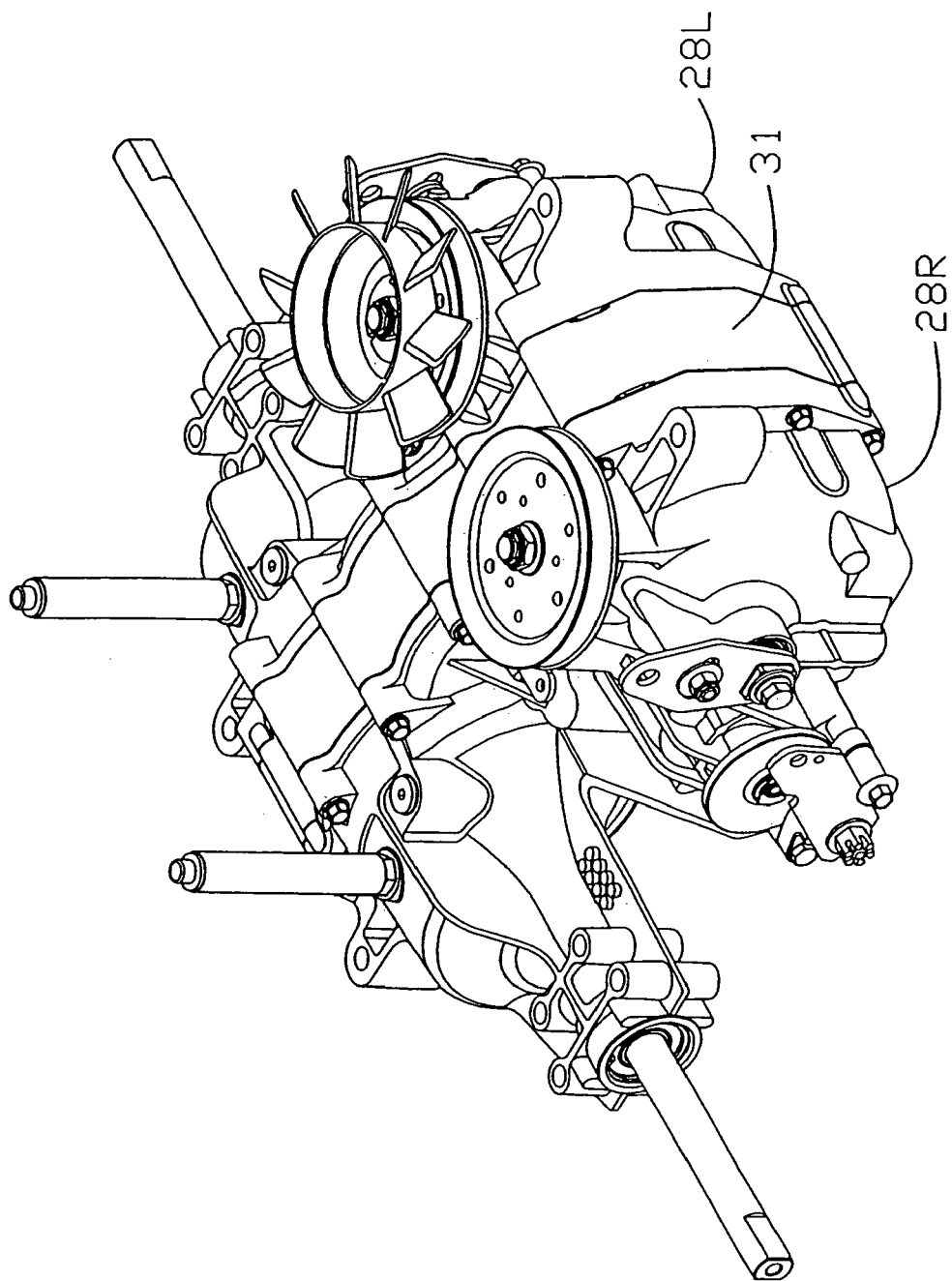
FIG. 6 illustrates a perspective view of a further exemplary embodiment of the integrated, zero-turn hydrostatic transaxle of FIG. 1 wherein a single plate replaces the cap members of the casings.
Figure 8:
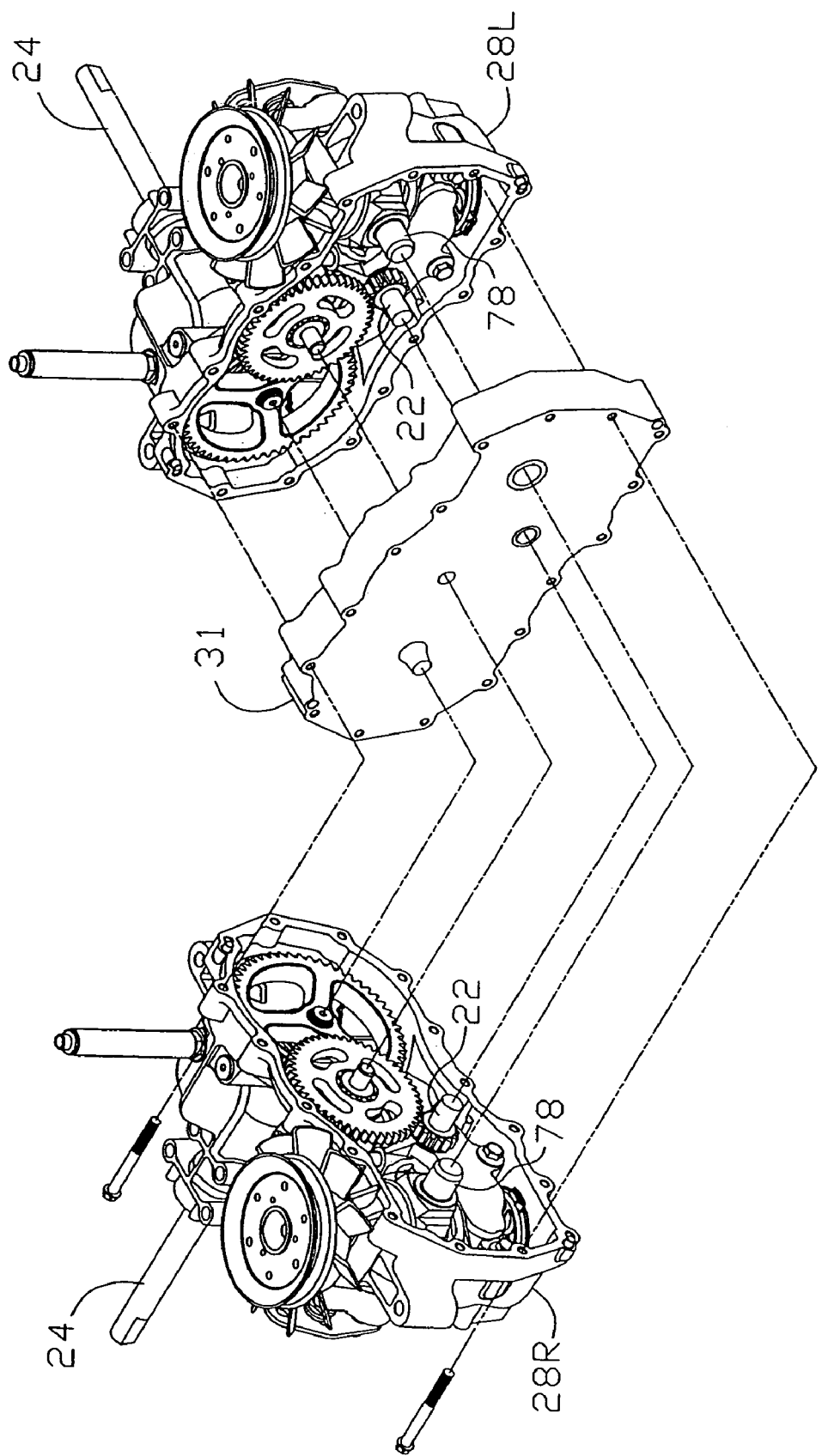
FIG. 8 illustrates an exploded view of the integrated, zero-turn hydrostatic transaxle of FIG. 6.

As illustrated in FIGS. 6 and 8, the casing may alternatively be arranged such that the second casing sections 30 are replaced by a single, unitary casing section 31 to which each of the first casing sections 28 are attached. In this case, the casing section 31 generally comprises a plate having openings for accepting the fasteners and the junction or sealing surfaces 32 between the casing section 31 and the first casing sections 28 lie in parallel, vertical planes. In this embodiment, there is minimal fluid transfer between the two units because of the high tolerances involved in the fit of various shafts into the bores. It will be appreciated that the illustrated bores need not be through holes but could be partially bored to accept the shafts of each unit while leaving an intermediate sealing surface. Bearings may be inserted into the bores, but these may or may not be necessary depending upon anticipated loads. The casing section 31 (as well as the plate member 33 described below) may be fabricated from bar stock, be die cast, or the like.

Figure 7:
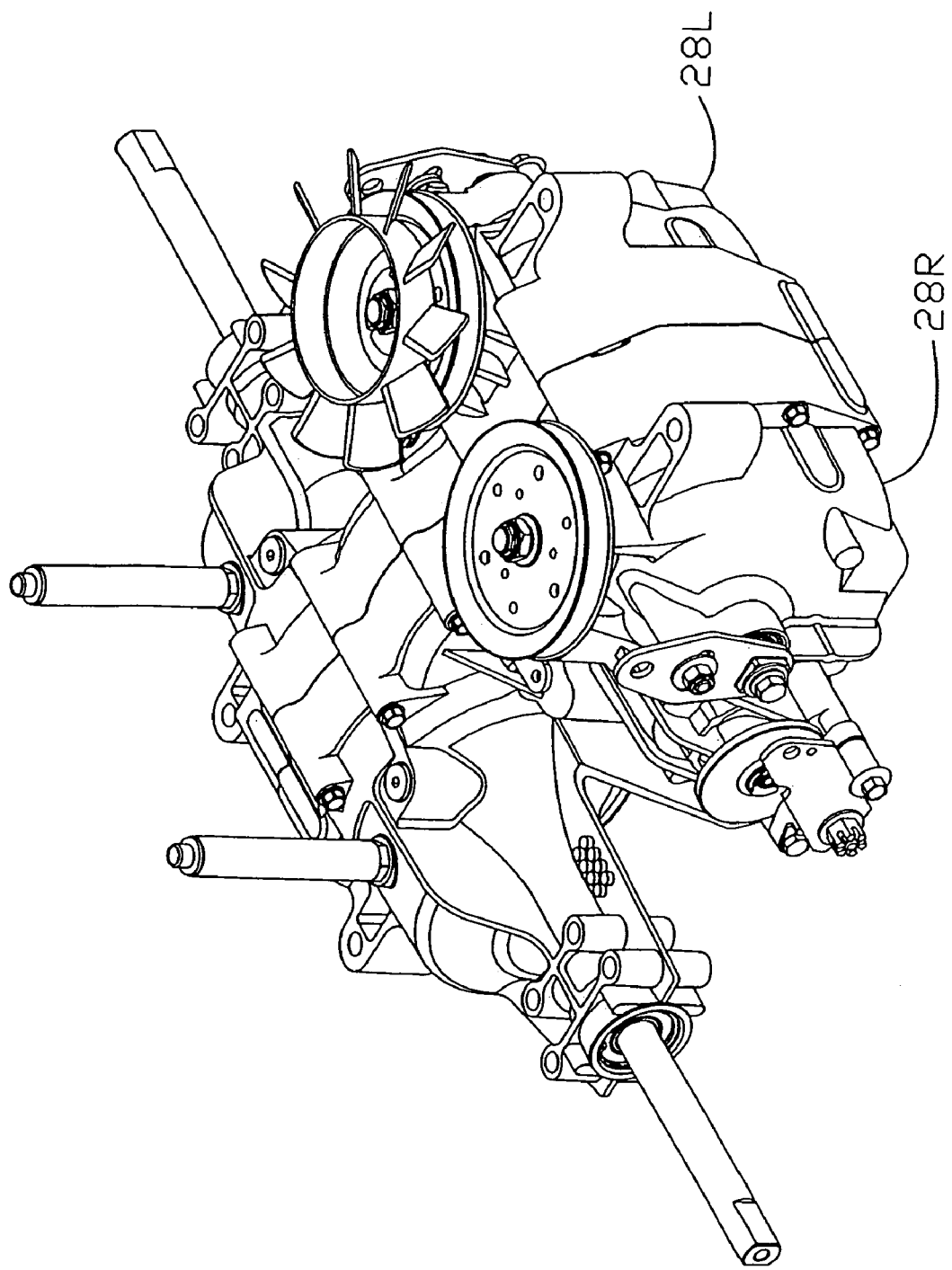
FIG. 7 illustrates a perspective view of yet another exemplary embodiment of the integrated, zero-turn hydrostatic transaxle of FIG. 1 wherein a single internal plate replaces the cap members of the casings.
Figure 9:
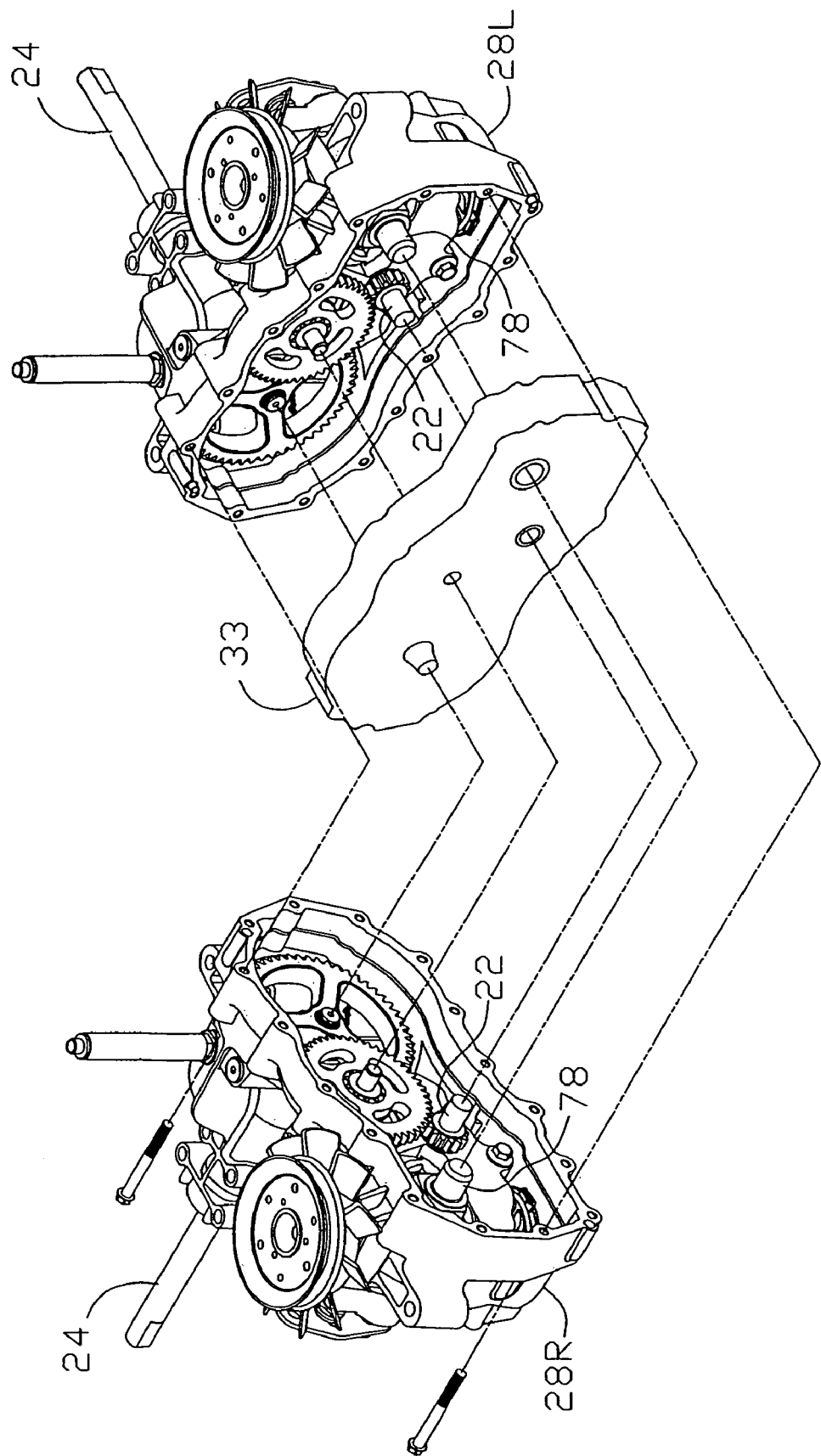
FIG. 9 illustrates an exploded view of the integrated, zero-turn hydrostatic transaxle of FIG. 7.

Still further, as illustrated in FIGS. 7 and 9, the casing may comprise a plate member 33 adapted to be attached over the interface of one or both of the first casing sections 28 at a vertical junction surface. In this embodiment, the first casing sections 28 of both HZTs 10 would be attached directly to one another at a single sealing surface using fasteners that pass through the openings in adjacent bosses. As a result of the joining of the first casing sections 28, the plate member(s) 33 would be located internally with respect to the attached casing sections 28. The plate member(s) 33 could be used to prevent movement of fluid from one HZT 10 to the other HZT 10 or allow for minimal leakage across bearings, cross holes, portings, and/or the like to allow for a single fluid fill. In the embodiment particularly illustrated in FIG. 8, cross holes are provided to accept the various shafts of the HZT 10.

In each of the illustrated embodiments, vertically extending from the top of the first casing member 28 is the input shaft 12 and horizontally extending from and supported by the first casing member 28 is the axle shaft 24. Thus, the axis of the axle shaft 24 is generally perpendicular to the substantially vertical junction surfaces of the casing. Similarly, the plane of the pump running surface 34 of the center section 20 is generally perpendicular to the substantially vertical junction surfaces while the plane of the motor running surface 36 of the center section 20 is generally parallel to the substantially vertical junction surfaces. The axis of the motor shaft 22 is also seen to be generally parallel to the axis of the axle shaft 24. It is to be understood, however, that this arrangement of components is merely illustrative and that the components can be otherwise arranged without departing from the scope of this invention.

Figure 24:
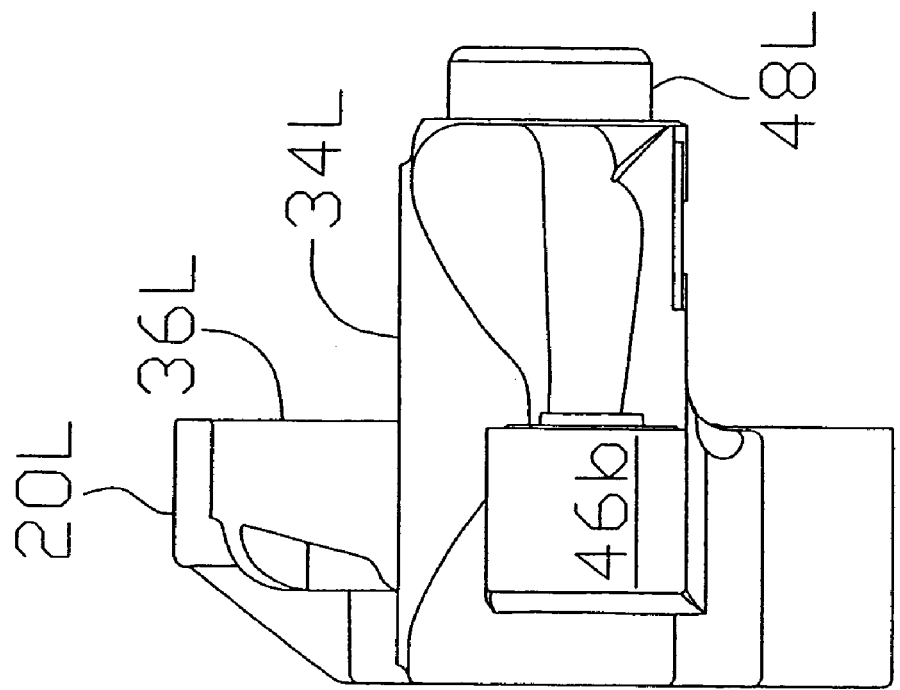
FIG. 24 illustrates a pump end view of exemplary center sections for use in connection with the integrated, zero-turn, hydrostatic transaxle of FIG. 1.
Figure 24:
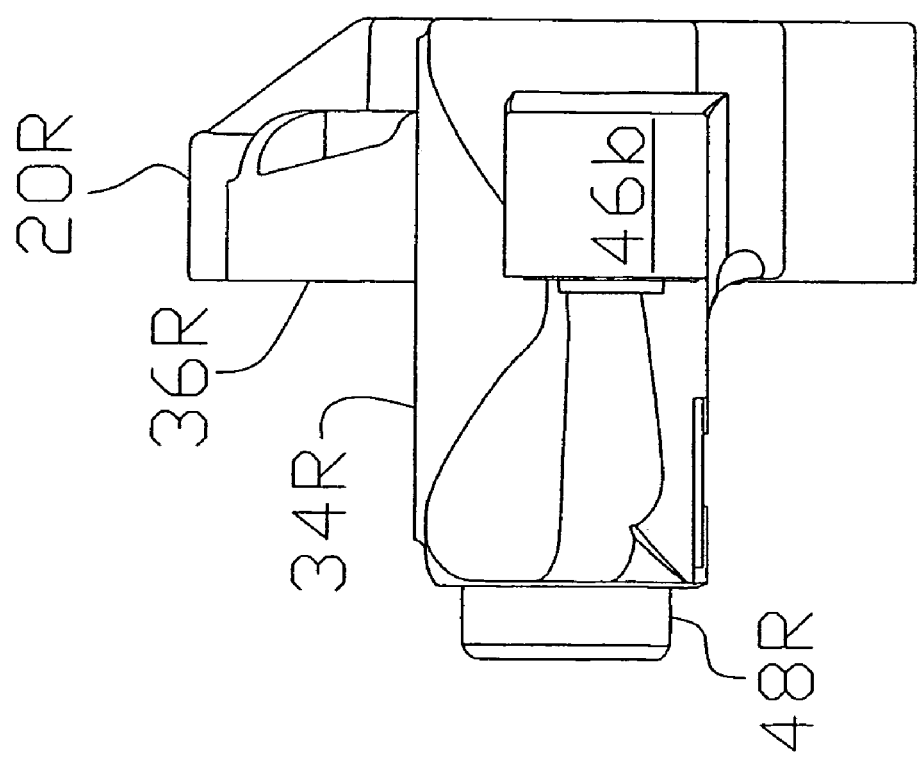
Figure 25:
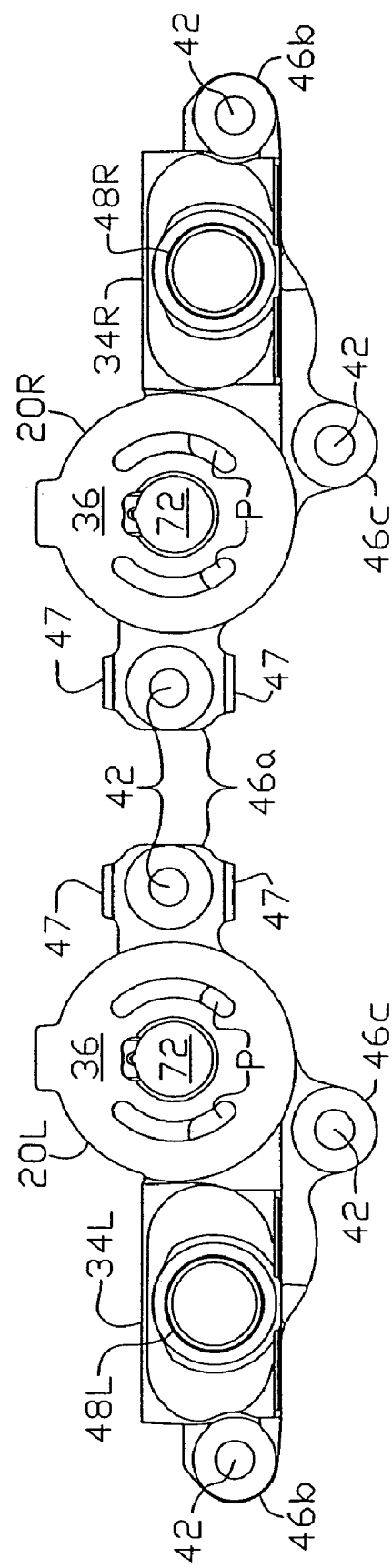
FIG. 25 illustrates a motor end view of the exemplary center sections of FIG. 24.
Figure 26:
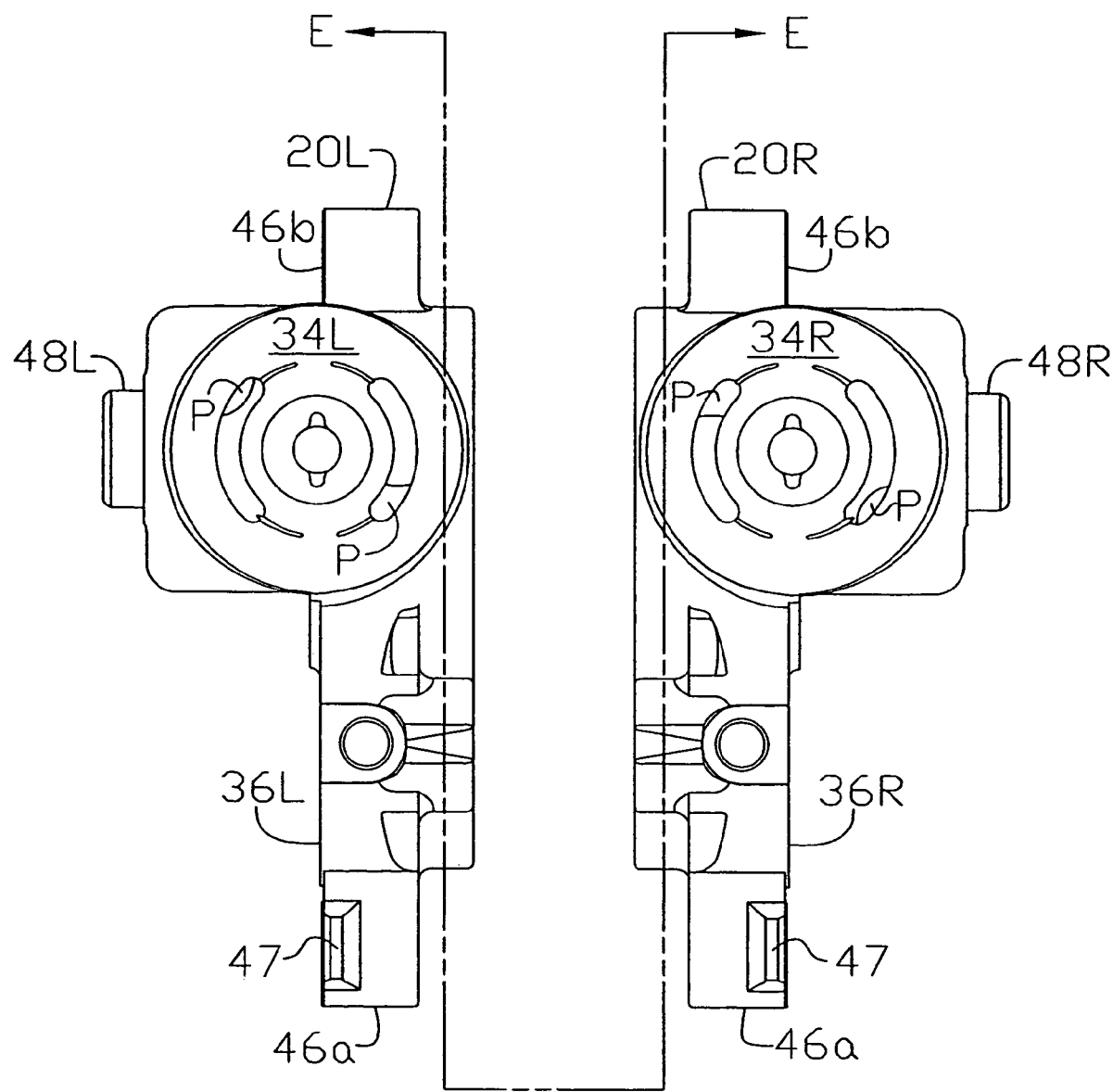
FIG. 26 illustrates a top view of the exemplary center sections of FIG. 24.
Figure 27:
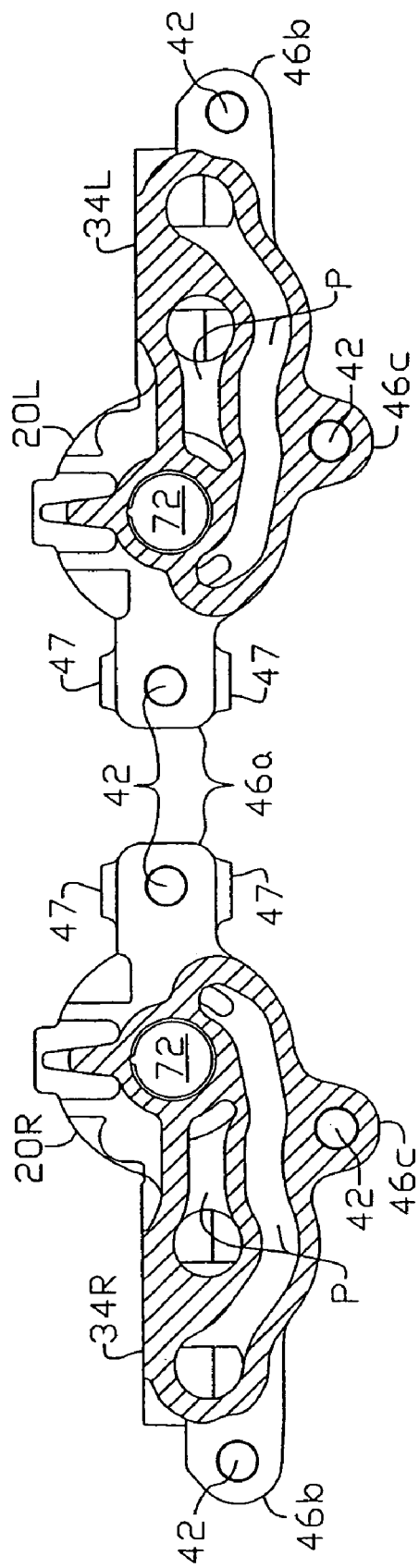
FIG. 27 illustrates a cross-sectional view of the exemplary center sections along lines E—E of FIG. 26.

For placing the hydraulic pump 14 in fluid communication with the hydraulic motor 18, the center section 20 includes hydraulic porting P, as is illustrated in FIGS. 25–28. As will be further seen in these figures as well as FIG. 24, the center sections 20L and 20R of each of the HZTs 10L and 10R, respectively, are generally mirror images of one another. However, since the input shafts 24 are rotated in the same direction when the vehicle is driven in the forward or reverse direction, the intersection of the kidneys, formed on the running surface 34, and the cross passages of the porting P are symmetrical as seen in FIG. 26. It will be appreciated, however, that the center sections 20L and 20R can be full mirror images of one another in the case where the angular rotation of the swash plates of each HZT are made non-symmetrical, i.e., the angle of rotation of the swash plates are reversed with respect to one another.

The hydraulic porting P is in further fluid communication with a source of makeup fluid, such as a fluid sump or a charge gallery, for example, by means of check plugs 60. Generally, the hydraulic porting P comprises a high pressure side through which fluid moves from the hydraulic pump 14 to the hydraulic motor 18 and a low pressure side through which fluid returns from the hydraulic motor 18 to the hydraulic pump 14. Since the center sections 20L and 20R are generally mirror images of one another, it will be appreciated that similar hydraulic porting P will be utilized when both the HZTs 10L and 10R are placed in the forward or reverse direction. This arrangement of the center section porting P provides each of the HZTs 10L and 10R with nearly identical hydraulic efficiencies.

Figure 28:
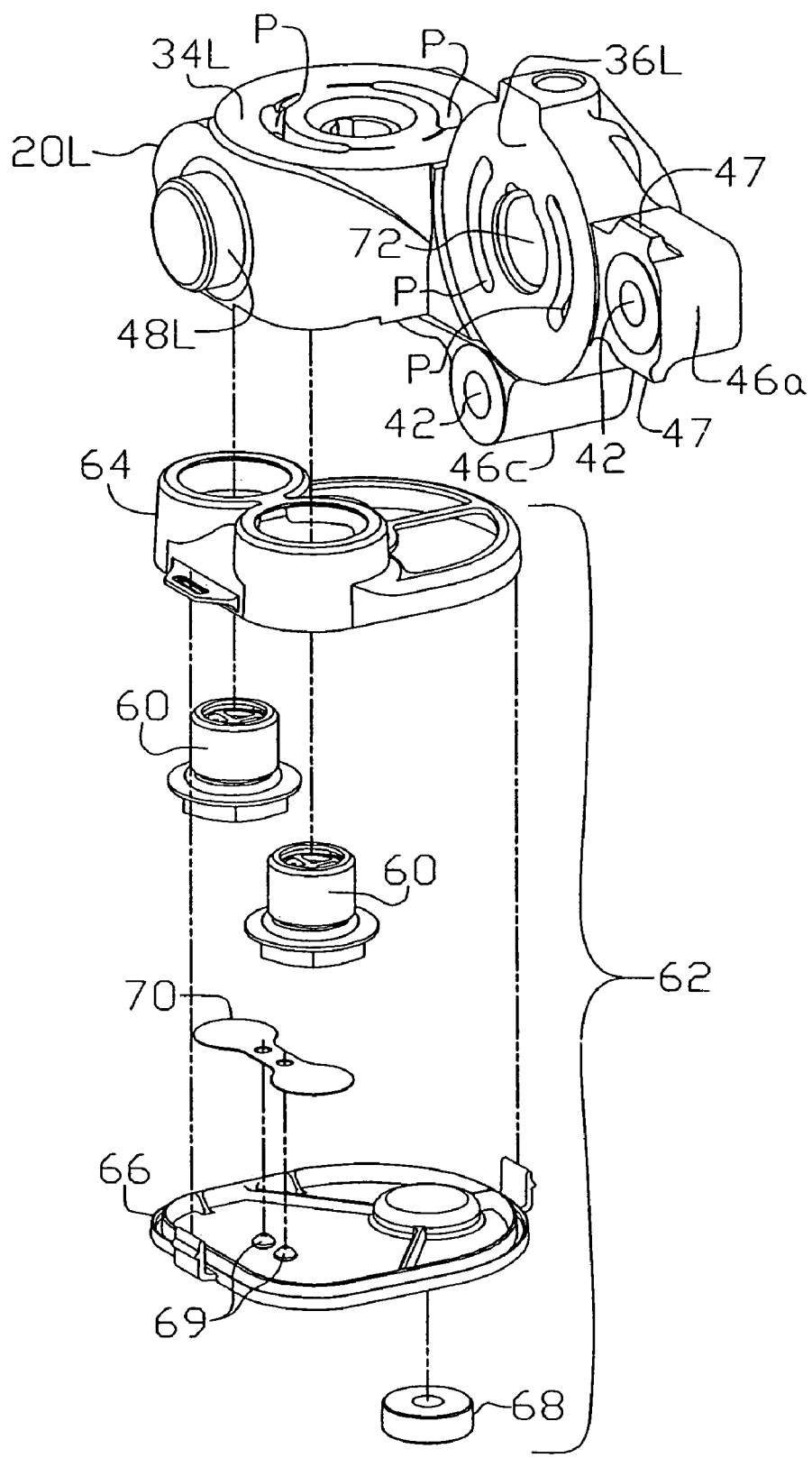
FIG. 28 illustrates an exploded view of an exemplary filter assembly for use in connection with the integrated, zero-turn hydrostatic transaxle of FIG. 1.

To minimize the introduction of impurities, such as metal shavings, into the hydraulic circuit when makeup fluid is drawn into the hydraulic circuit, an upward facing filter assembly 62, illustrated in FIG. 28, may be positioned adjacent to the center section 20 through which fluid may pass from the sump to the hydraulic porting P. The upward facing filter assembly 62 reduces the potential that air is ingested into the hydraulic porting P as it provides an upward facing exit path for the air. This is especially the case when the filter assembly 62 is positioned in a generally non-turbulent area of operation within the HZT 10.

By way of example, the filter assembly 62 may be comprised of an upper filter member 64 that carries the filtering mesh. The upper filter member 64 is positioned adjacent to the center section 20. Attached to the upper filter member 64, for example by being snap-fit thereto, is a lower filter member 66 that forms a seal with the upper filter member 64 such that make-up enter the interior formed by the joined upper and lower filter members 64 and 66 substantially via the filtering mesh. The attached upper filter member 64 and lower filter member 66 may be maintained in position relative to the center section 20 by means of the check plugs 60 the ends of which extend into the interior formed by the joined upper and lower filter member 64 and 66. Carried by the lower filter member 66 may be a magnet 68 and a deflector shield 70 for protecting the lower filter member 66 from fluid expelled via the check plugs 60. The magnet 68 is preferably molded into the lower filter member 66 although it may be attached to the lower filter member 66 using an adhesive, for example, as shown in FIG. 1 of U.S. Pat. No. 5,613,409 which is incorporated herein by reference in its entirety or by snap-fit engagement, a staking process, or the like. The deflector shield 70 is attached to the lower filter member 66 by tabs 69 that are formed during the molding process. The deflector shield 70 may also be retained by heat staking to plastic posts, fasteners, or the like.

For attaching the center section 20 to the first casing member 28, fasteners 40 (e.g., bolts) may be passed through openings 42 formed in the center section 20 to mate with attachment points 44 (e.g., threaded holes) formed in the first casing member 28. In an embodiment illustrated in FIGS. 4, 16, 17 and 24–28, the center section 20 is formed with three extensions 46 each having an opening 42. A first one of the extensions 46a extends from a side of the center section 20 proximate to the motor running surface 36, a second one of the extensions 46b extends from a side of the center section 20 proximate to the pump running surface 34, and a third one of the extensions 46c extends from the bottom of the center section 20. The axis of the openings 42 are parallel to the axis of the opening 72 through which the motor shaft 22 passes.

Figure 16:
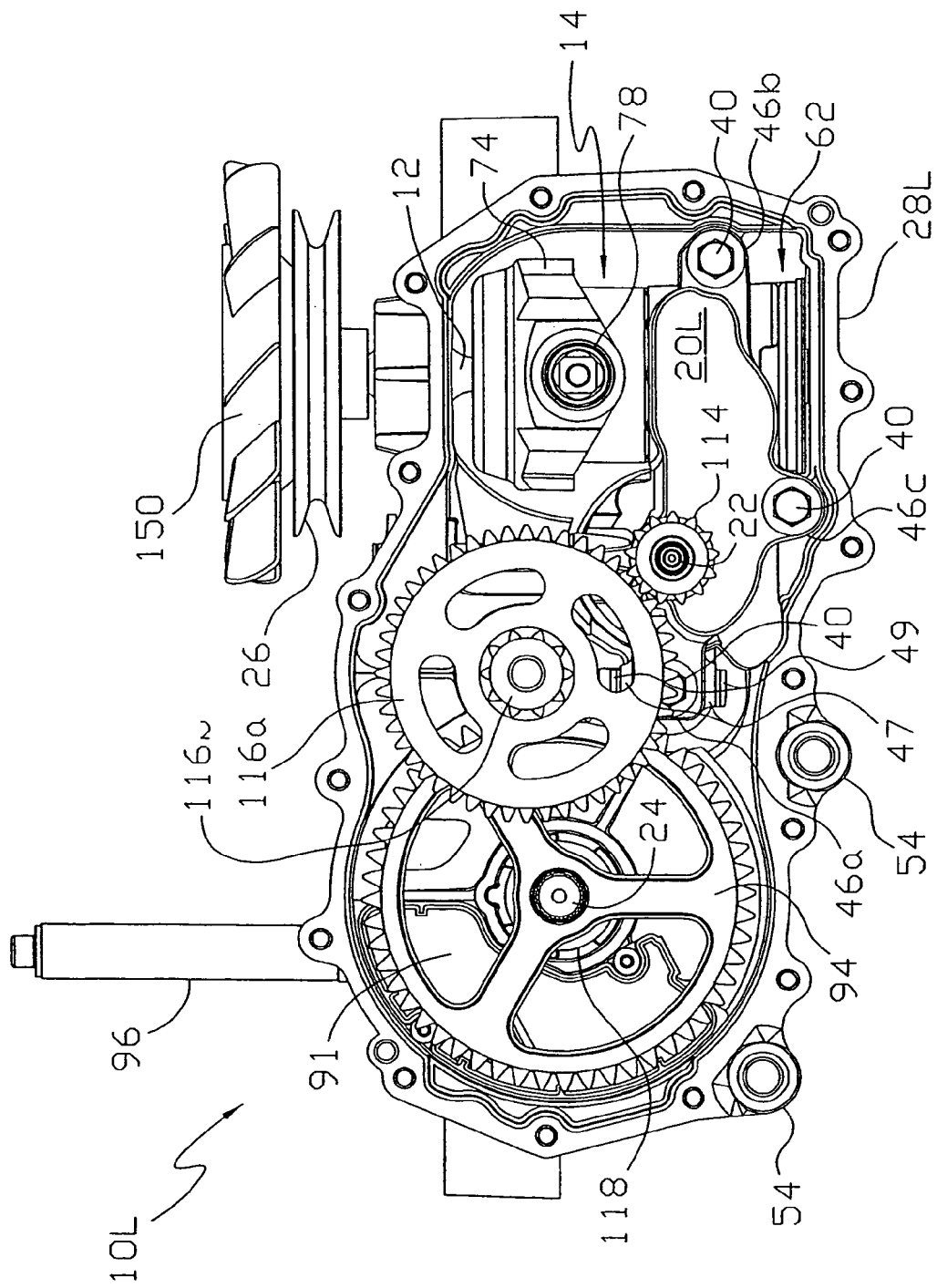
FIG. 16 illustrates a side view of the exemplary, zero-turn, hydrostatic transaxle of FIG. 12 with the cap member removed.

For use in orienting the center section 20 within the first housing section 28, a side of the center section 20 may be provided with a protuberance 48, e.g., a machined diameter, that extends from the center section 20 proximate to the pump running surface 34. The protuberance 48 is adapted to mate with a center section locator 50 formed in the first casing member 28 and to thereby establish an arbitrary X-Y orientation of the central axis of the protuberance 48 and one locating point of the center section 20. The axis of the protuberance 48 is also parallel to the axis of the openings 42 and to the axis of the opening 72 through which the motor shaft 22 passes. Meanwhile, on extension 46a are a pair of flats 47, located on the top and bottom of extension 46a as illustrated in FIG. 28, that are adapted to mate with features 49 formed in the first casing member 28 to locate the center section 20 rotationally, as illustrated in FIG. 16. The mating of the fasteners 40 to the first casing member 28 then provides a Z-axis locator for the center section 20 as illustrated in FIGS. 18 and 19.

For adjusting the amount of oil that is pushed from the hydraulic pump 14 to the hydraulic motor 18 via the high pressure side of the hydraulic porting P, each HZT 10 includes a moveable swash plate 74 against which the pump pistons 16 travel. The direction of rotation of the hydraulic pump 14 is fixed by the rotation of the input shaft 12. The hydraulic pump 14 is nearly always rotated in one direction. As will be understood by those of ordinary skill in the art, the swash plate 74 may be moved to a variety of positions to vary the stroke of the pump pistons 16 and the direction of rotation of the hydraulic motor 18. Generally, as the swash plate 74 angle is varied in one direction from the neutral position the stroke of the pump pistons 16 is varied, which then drives the hydraulic motor 18 in a direction determined by the hydraulic porting at a speed determined by the volume of the fluid displaced by the pump pistons 16 and the torque delivered by the input shaft 12. As will be appreciated, rotation of the hydraulic motor 18 results from the motor pistons 19 moving against a thrust bearing 76 under the influence of the hydraulic fluid. As the angle of the swash plate 74 is decreased to pass through the neutral position, the direction of rotation of the hydraulic motor 18 is reversed and the speed of the hydraulic motor 18 is again determined by the volume of fluid displaced by the pump pistons 16 and the torque delivered by the input shaft 12.

Since the speed of rotation of the hydraulic motor 18 is dependent upon the amount of hydraulic fluid pumped thereinto by the hydraulic pump 16 and the direction of rotation of the hydraulic motor 18 is dependent upon the direction of angular rotation of the swash plate 74, the positioning of the swash plate 74 is seen to control the speed and direction of rotation of the hydraulic motor 18 and, as will be apparent, the speed and direction of rotation of the axle shaft 24. While it is true that the direction of rotation of the hydraulic motor 18 will be affected by the rotation of the hydraulic pump 16, the variation of rotation from one direction to another is accomplished completely by the swash plate 74.

Figure 18:
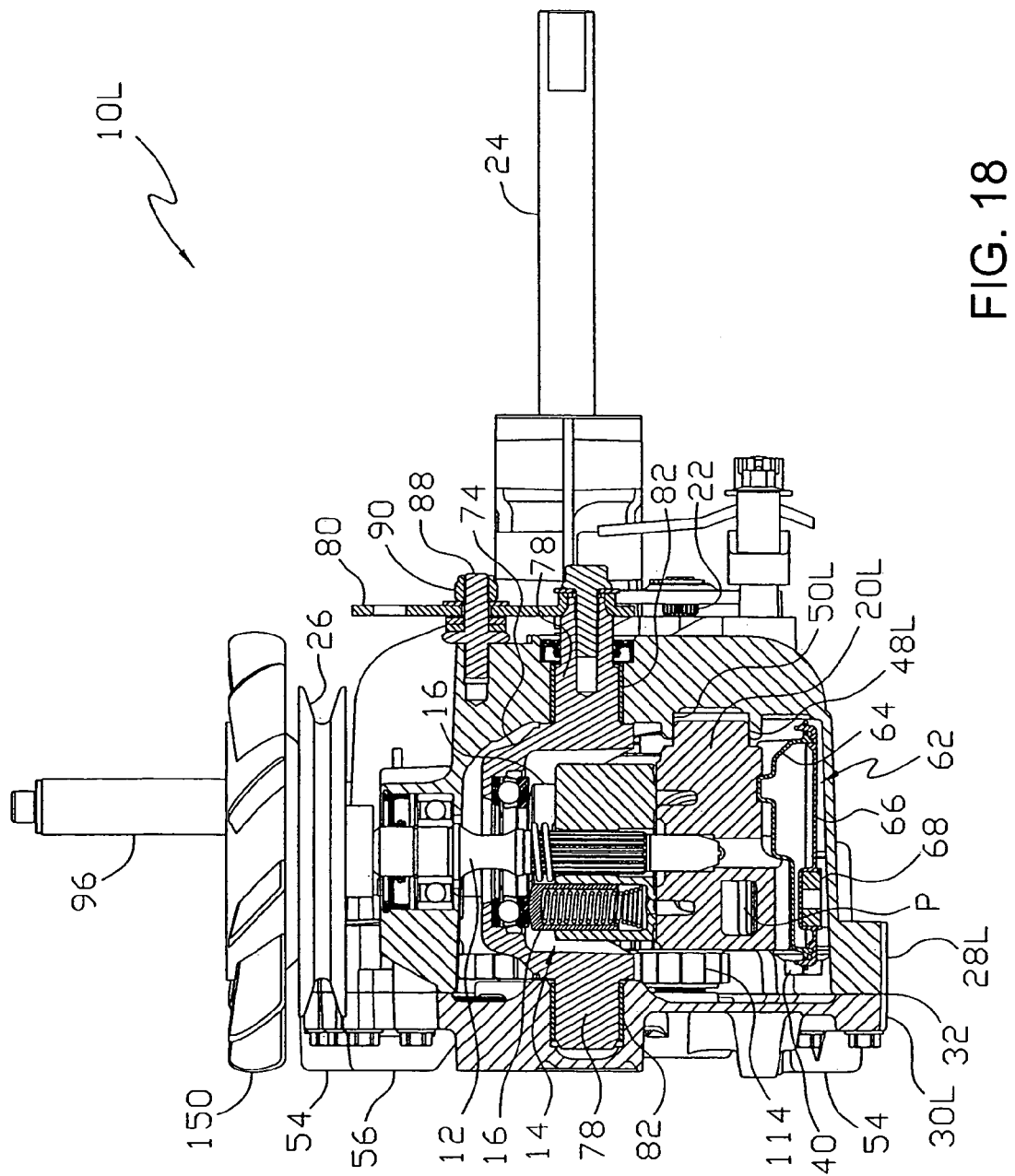
FIG. 18 illustrates a cross-sectional view of the exemplary, zero-turn, hydrostatic transaxle along line A—A of FIG. 15 with an exemplary, outboard control arm mechanism and outboard brake mechanism.
Figure 19:
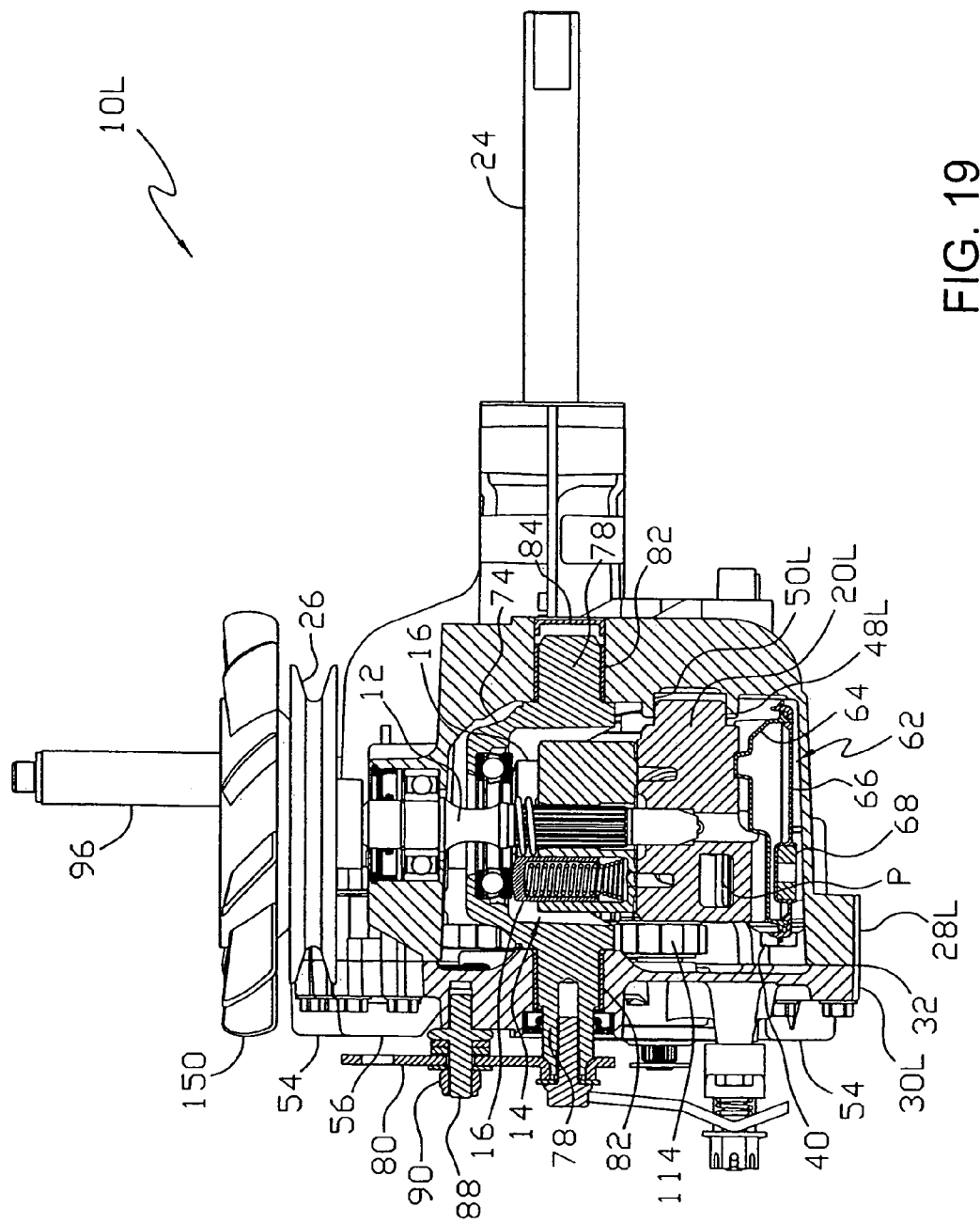
FIG. 19 illustrates a cross-sectional view of the exemplary, zero-turn, hydrostatic transaxle along line A—A of FIG. 15 with an exemplary, inboard control arm mechanism and inboard brake mechanism.

For moving the swash plate 74, the swash plate 74 is supported by a pair of trunnion arms 78 that are rotatably supported in the casing of the HZT 10 as illustrated in FIGS. 18 and 19. As will be appreciated, rotation of the trunnion arms 78 changes the angular orientation of the swash plate 74 with respect to the pump pistons 16. To rotate the trunnion arms 78 and, accordingly, move the swash plate 74, a speed adjusting mechanism is coupled to one of the trunnion arms 78. A control arm 80 of the speed adjusting mechanism may be connected, via a driving link, to a lever or a pedal provided on a vehicle whereby movement of the lever or pedal is translated to the control arm 80 to cause the rotation of the trunnion arms 78 and movement of the swash plate assembly. A further, exemplary speed adjusting mechanism with a return to neutral mechanism 41 is illustrated in FIG. 8 of U.S. patent application Ser. No. 09/789,419 and which is incorporated herein by reference in its entirety.

It is to be further appreciated that the control arm 80 may be located on either the outboard or inboard side of the casing of HZT 10, as illustrated in FIGS. 18 and 19, respectively. To this end, the first casing member 28 may be provided with a pair of opposed bearing seats 82 in which the trunnion arms 78 are carried. The casing may then have openings adjacent to both of the bearing seats 82, illustrated in FIG. 19, by which the control arm 80 can be attached to one of the trunnion arms 78. Thus, depending upon the desired location for the control arm 80, the control arm 80 would be mated to one of the trunnion arms 78 by way of one of the openings and the opposite opening would be closed with a seal 84. Alternatively, the casing can have an opening adjacent to just one of the bearing seats 82, as illustrated in FIG. 18. In this case, it will be appreciated that the location of the single opening will dictate whether the control arm 80 is mounted on the inboard side or the outboard side of the casing of the HZT 10. It will be further appreciated that when it is desired to have an inboard control arm 80 on an integrated, zero-turn, hydrostatic transaxle assembly, sufficient spacing is to be provided between the joined casings of the HZTs 10L and 10R, similar to but larger than the spacing illustrated in FIGS. 1 and 2. The spacing is used to accommodate the control arms 80 (as well as any inboard braking mechanisms that are described hereinafter).

Figure 14:
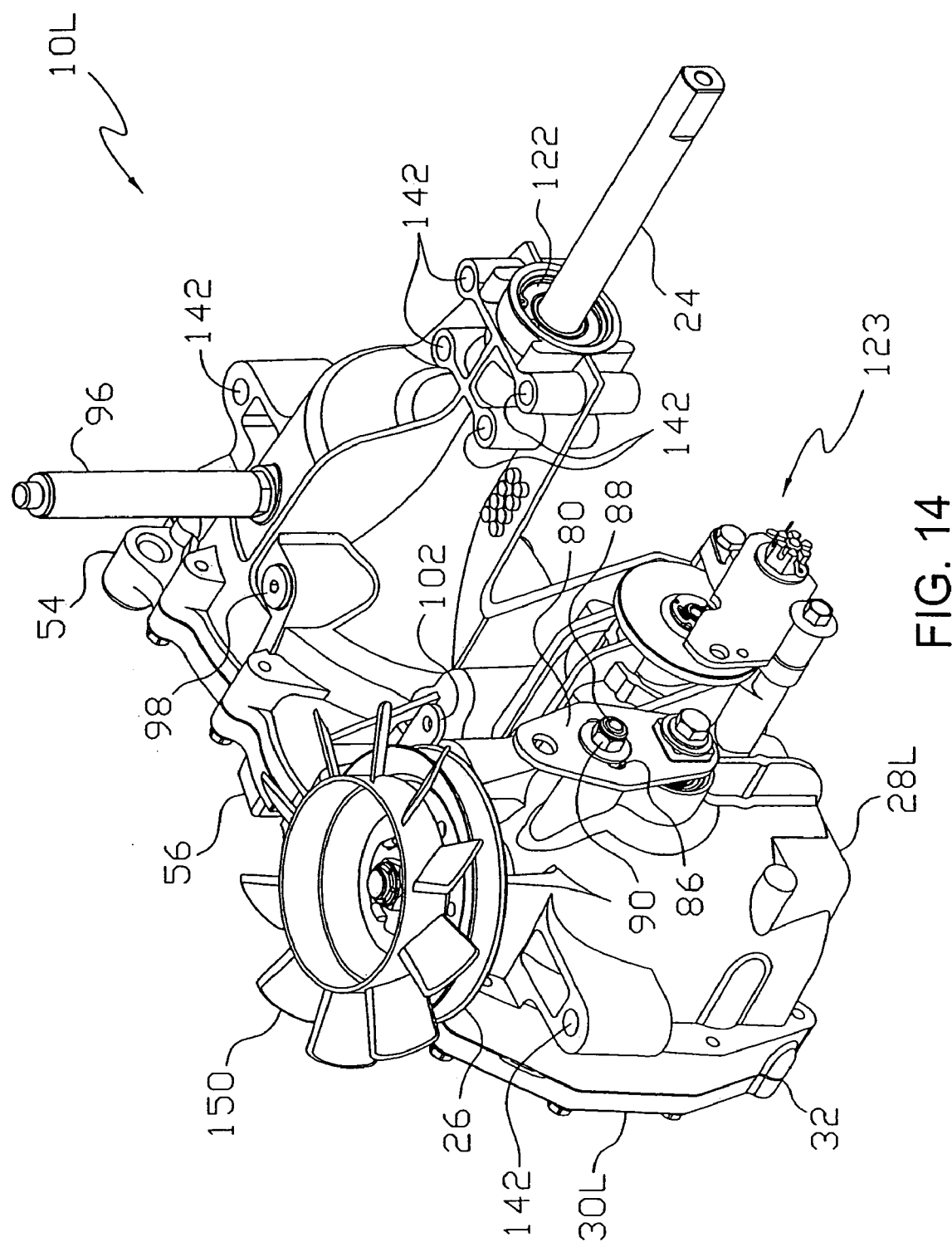
FIG. 14 illustrates a perspective view of the exemplary, zero-turn, hydrostatic transaxle of FIG. 10 further illustrating an exemplary, outboard, disk brake mechanism and outboard control arm mechanism.
Figure 15:
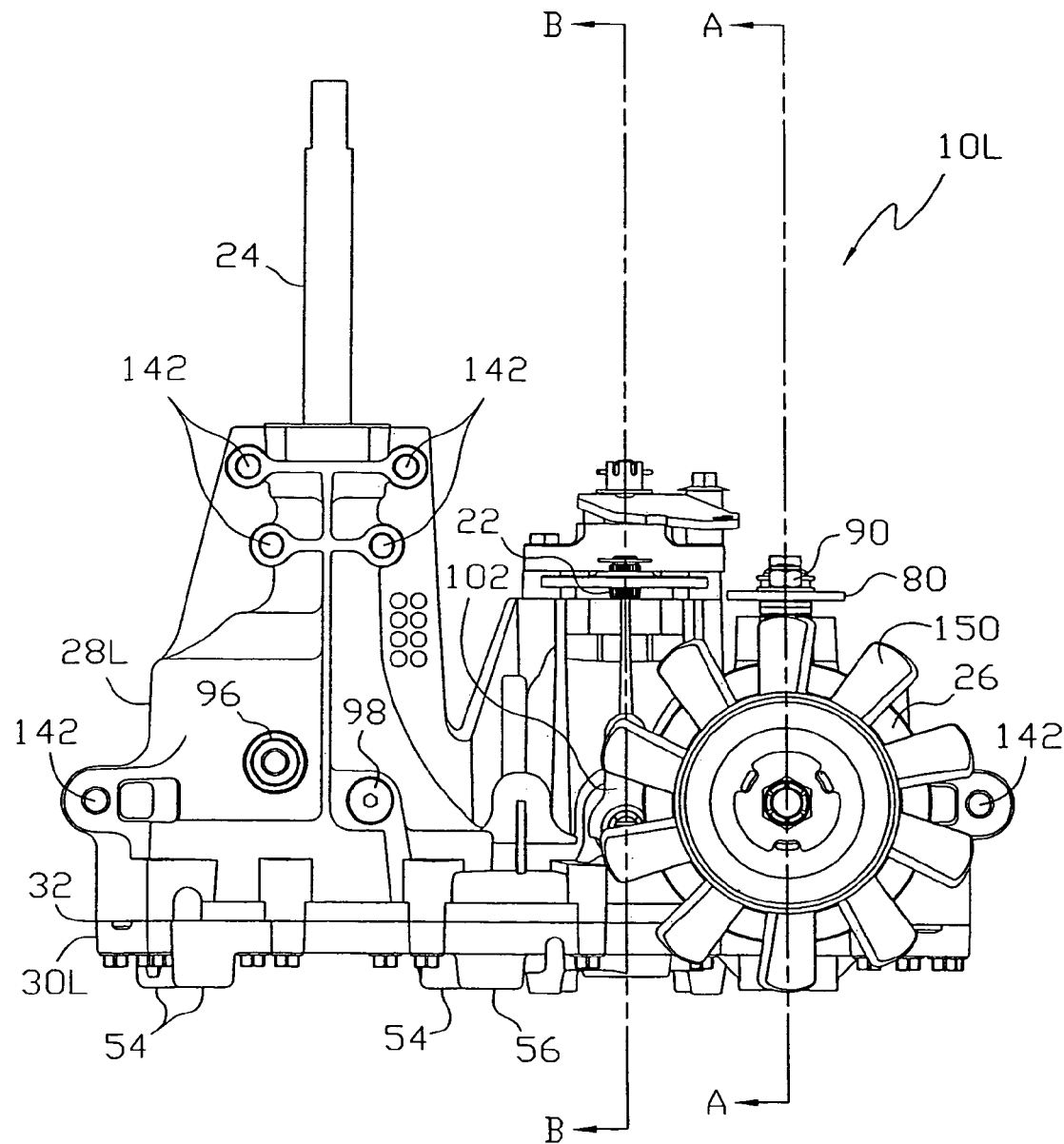
FIG. 15 illustrates a top view of the exemplary, zero-turn, hydrostatic transaxle of FIG. 14.

For limiting the range of motion of the control arm 80, the control arm 80 may be provided with a slot 86 that cooperates with a stop 88, such as a bolt or the like, attached to the casing as illustrated in FIG. 14. It will also be appreciated that the control arm 80 may be locked into the neutral position, for example during shipment of the HZT 10 and/or during assembly into a vehicle. To this end, as illustrated in FIG. 1, a nut 90 may be attached to the stop 88 to frictionally engage the control arm mechanism and thereby prevent its movement. The slot 86 of the control arm 80 may be asymmetrical to thereby allow a greater speed to be imparted to the axle 24 in the forward direction as compared to the reverse direction.

Figure 17:
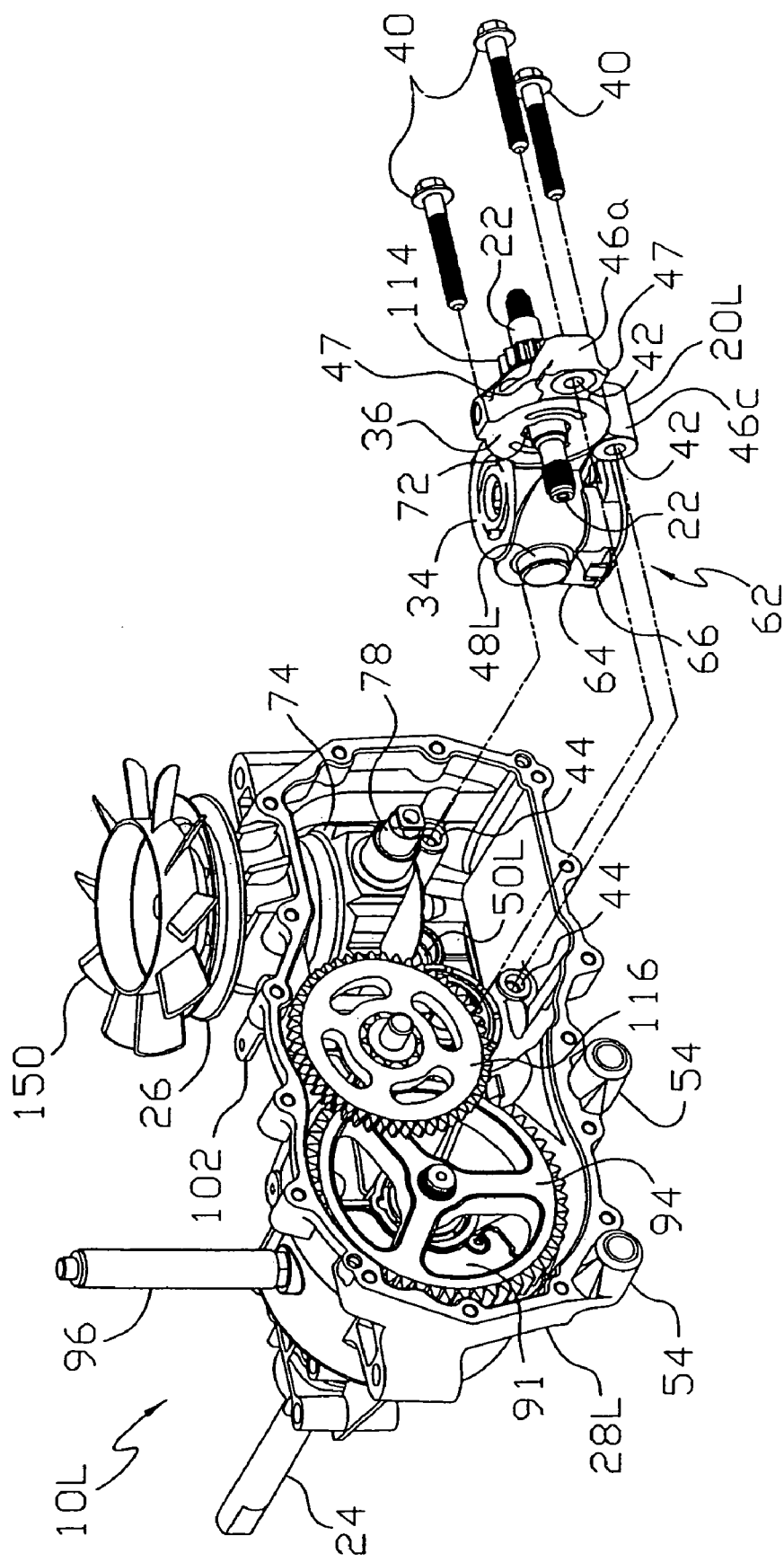
FIG. 17 illustrates an exploded view of the exemplary, zero-turn, hydrostatic transaxle of FIG. 12 particularly illustrating an exemplary center section, filter mechanism, and attachment hardware.

To provide a space for hydraulic fluid to expand into during operation of the HZT 10, each HZT 10 may include an internally located expansion tank 92 as illustrated in FIGS. 16 and 17. In the illustrated embodiment, the expansion tank 92 is positioned within the HZT casing adjacent to a bull gear 94 that is used to drive the axle shaft 24. Venting of the expansion tank 92 to atmosphere is accomplished via a breather tube 96 that extends from a top of the casing of the HZT 10. Such an expansion tank may be seen in U.S. patent application Ser. No. 10/062,734, that is incorporated herein by reference in its entirety. Fluid may be added to the HZT 10 by means of an oil fill port 98 that is also formed on the top of the casing of the HZT 10. Further, the expansion tank cover 91 may be provided with an indentation 93 and a thumb stop 95 (that extends below the sealing surface) by which the expansion tank cover 91 may be grasped for insertion into the first casing section 28. The indentation 93 is particularly sized to accept a finger of the installer. In this manner, the expansion tank cover 91 may be installed while allowing the user to avoid contacting sealant carried on the sealing surface of the cover 91.

To enable the vehicle on which the HZTs 10 are mounted to roll or "freewheel" without resistance from the hydraulic fluid, each HZT 10 may include a hydraulic bypass. Generally, when an HZT 10 does not have a motive force being applied to it, the hydraulic pump 14 and the hydraulic motor 18 are not being rotated. Therefore, any attempt to roll the vehicle would transmit rotational energy through axle shaft 24 to the motor shaft 22, via any internal gearing, thereby causing the hydraulic motor 18 to rotate. The rotation of the hydraulic motor 18, and the action of motor pistons 19 against motor thrust bearing 76, causes fluid to flow through the hydraulic porting P of the center section 20 to the hydraulic pump 14. However, with the hydraulic pump 14 being in neutral, the resultant pressure causes resistance to motion of the motor shaft 22 and the axle shaft 24 and prevents the user from easily pushing the vehicle.

Figure 23:
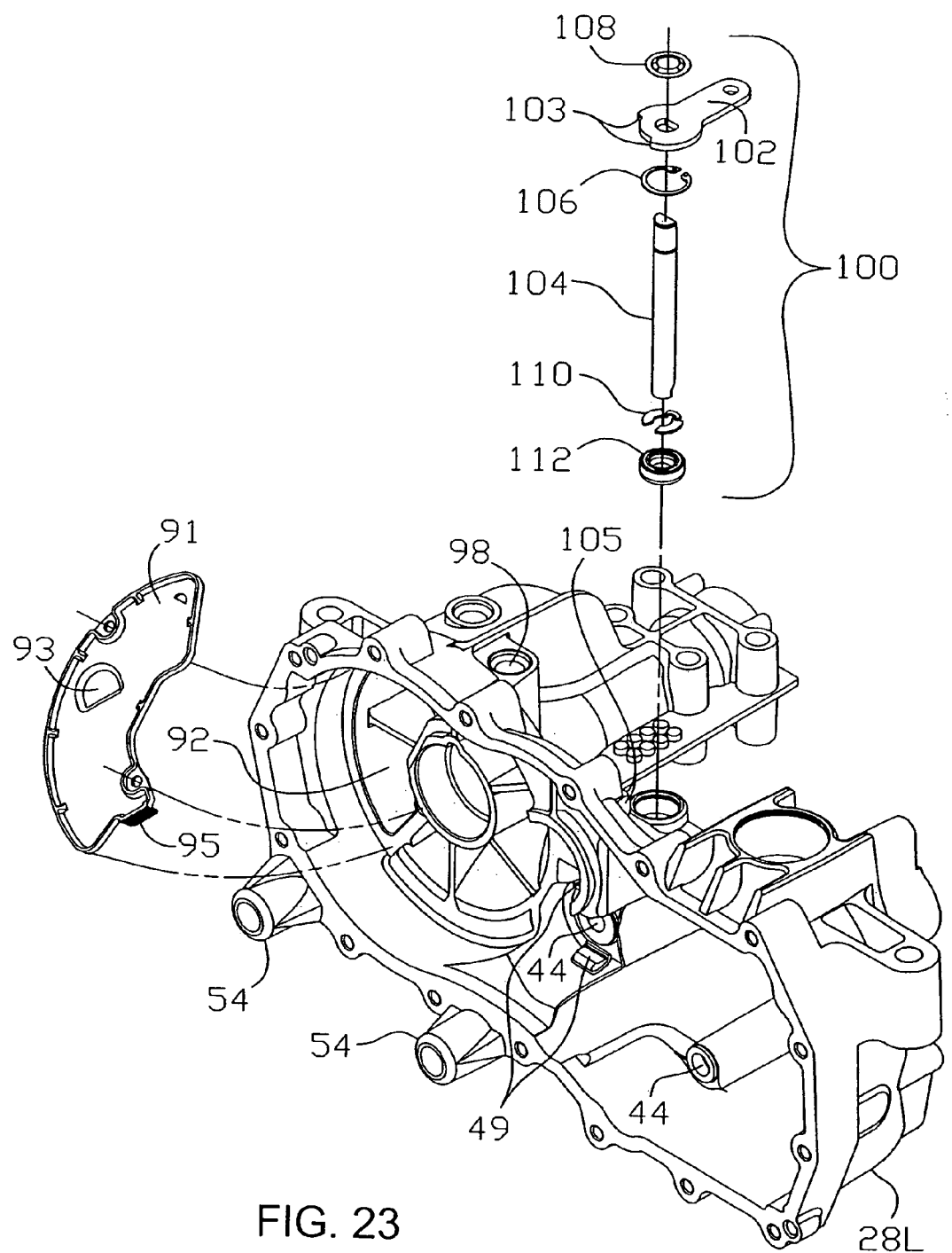
FIG. 23 illustrates an exploded view of an exemplary bypass mechanism and internal expansion tank cover for use in connection with the integrated, zero-turn, hydrostatic transaxle of FIG. 1.

To solve this problem, a bypass mechanism 100 may be associated with the hydraulic circuit to allow fluid to flow between the high pressure side and the low pressure side of the center section 20 porting. The bypass mechanism 100, illustrated in FIG. 23, may be activated via rotation of a bypass arm 102 that is located proximate to the top of the casing of the HZT 10. The bypass arm 102 is linked to a bypass actuator 104 that, in turn, interfaces with the center section 20 at its distal end. The degree of movement of the bypass arm 102 may be controlled by providing the control arm 102 with a notch 103 the shoulders of which are adapted to engage a stop 105 formed on the casing to limit how far the bypass arm 102 may be rotated.

In order to locate the relatively featureless bypass actuator 104 within the casing, a retaining ring 110 is attached to a groove in the bypass actuator 104. Once the bypass actuator 104 and retaining ring 110 are installed, a second retaining ring 106 is installed to keep retaining ring 110 in place. A seal 112 may also be placed adjacent to the retaining ring 110.

The bypass arm 102 interfaces with bypass actuator 104 by means of a tapered flat surface that prevents relative rotation between the bypass actuator 104 and the bypass arm 102. Push nut 108 aids in maintaining engagement between the bypass arm 102 and the bypass actuator 104. In this manner, rotation of the bypass actuator 104, via the bypass arm 102, can be used to move a puck, pin, or the like to lift the hydraulic motor 18 off of the motor running surface of the center section 20 to break the hydraulic circuit and thereby allow for freewheeling as described in U.S. Pat. Nos. 5,201,692, 5,423,182, and 5,497,623 which are incorporated herein by reference in their entirety.

To drive the axle shaft 24, gearing may be provided that functions to drivingly couple the axle shaft 24 to the motor shaft 22. By way of example, with reference to FIGS. 16 and 17, the motor shaft 22 may include a drive gear 114 that drivingly engages one or more reduction gears 116 that drive the bull gear 94 which, in turn, drivingly engages the axle shaft 24. In the illustrative embodiment, two reduction gears 116a and 116b are provided wherein the first reduction gear 116a engages the drive gear 114 and drives the second reduction gear 116b that is set within the inside diameter of the first reduction gear 116a. The second reduction gear 116b drives the bull gear 94.

Figure 22:
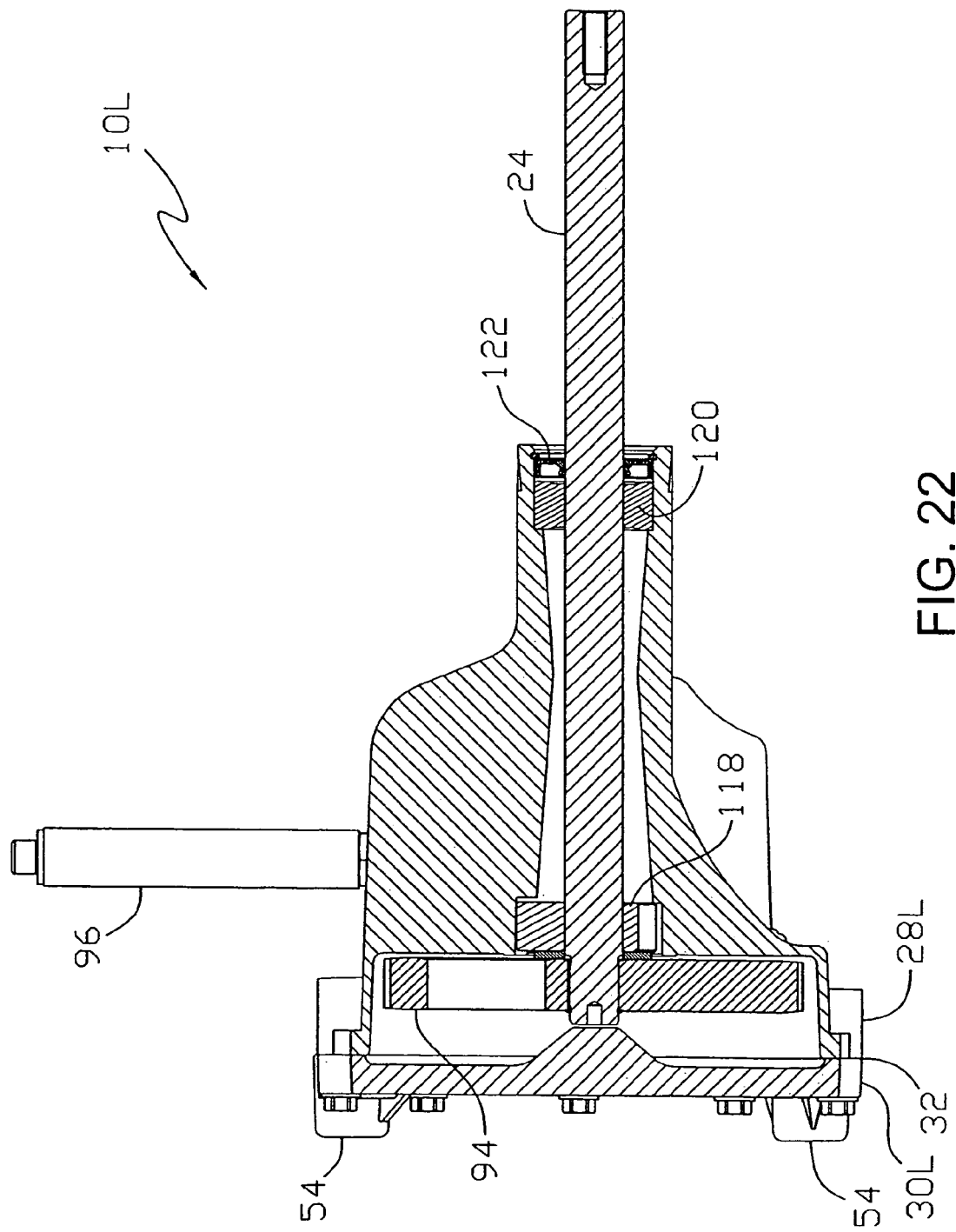
FIG. 22 illustrates a cross-sectional view of the exemplary, zero-turn, hydrostatic transaxle along line D—D of FIG. 13.

As further illustrated in FIG. 22, a proximal end of the axle shaft 24 is carried by an inboard bushing 118 positioned within the first casing section 28 adjacent to the bull gear 94. Axial movement of the axle shaft 24 in an inward direction towards the bull gear 94 is prevented since the proximal end of the axle shaft 24 is restrained by contacting an interior wall of the first casing section 28. Axial movement of the axle shaft 24 in an outward direction may be prevented through the use of a retaining ring positioned adjacent to the inward side of the bull gear 94. The first casing section 28 also includes an axle horn in which is carried an outboard bushing 120 that provides additional support for the axle shaft 24. A seal and retaining ring pack 122 is positioned in the axle horn on the outboard side of the bushing 120. It is to be understood that the distal end of the axle shaft 24 is adapted to have a vehicle wheel mounted thereto.

Figure 10:
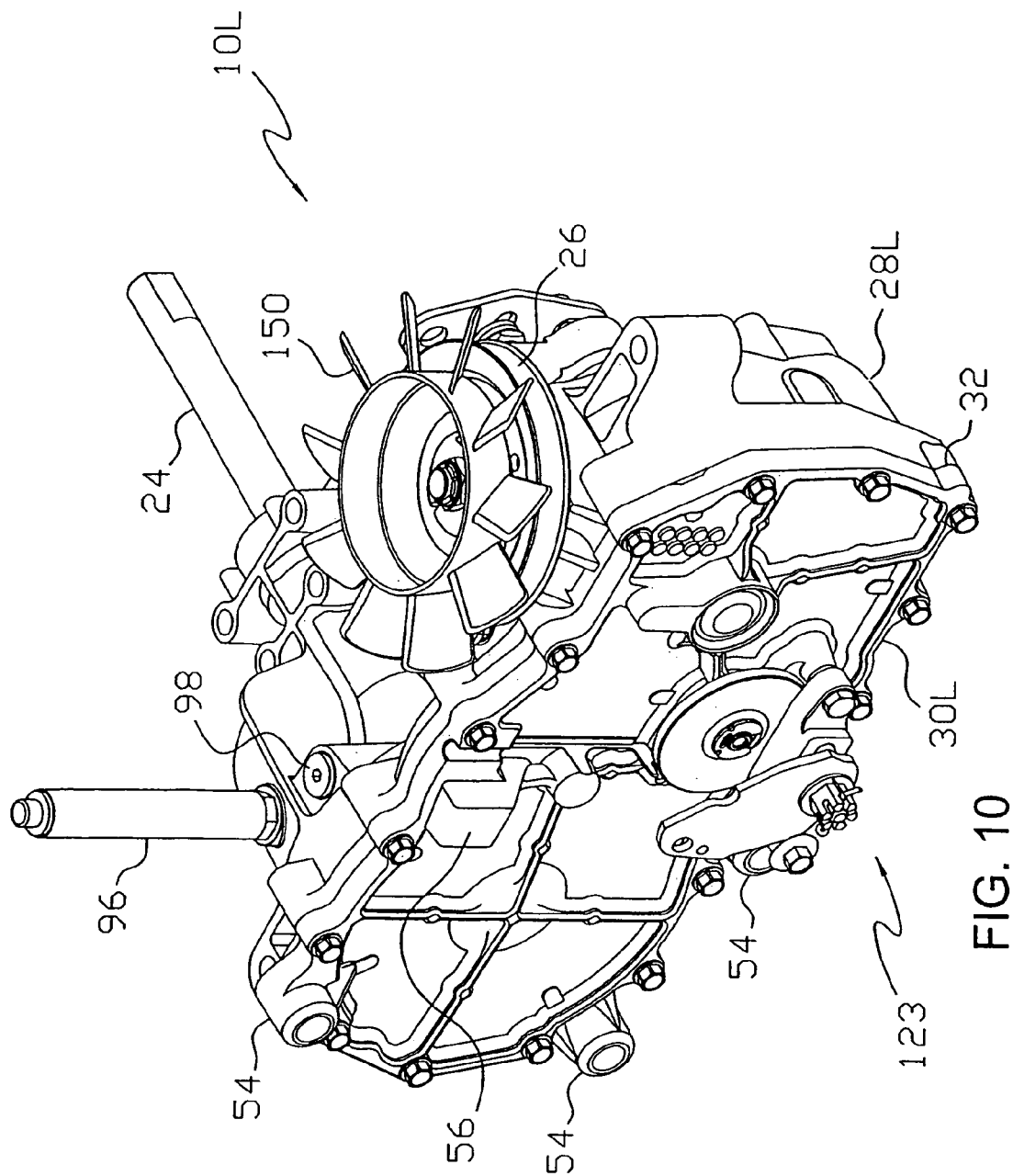
FIG. 10 illustrates a perspective view of an exemplary, zero-turn, hydrostatic transaxle used to form the integrated zero-turn, hydrostatic transaxle of FIG. 1 further illustrating an exemplary, inboard, disk brake mechanism and outboard control arm mechanism.
Figure 11:
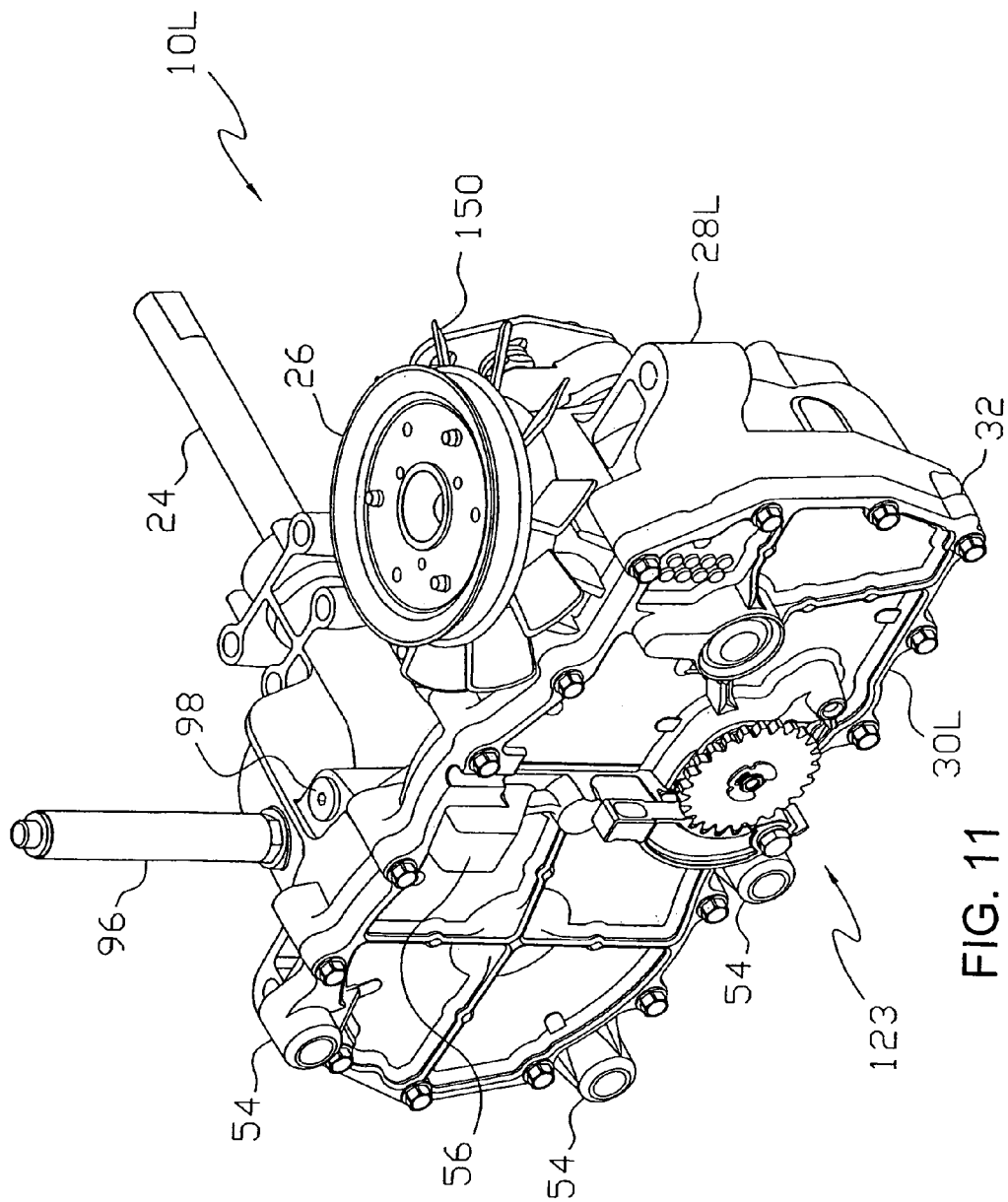
FIG. 11 illustrates a perspective view of the exemplary zero-turn, hydrostatic transaxle of FIG. 10 further illustrating an exemplary, inboard, cog brake mechanism and outboard control arm mechanism.
Figure 12:
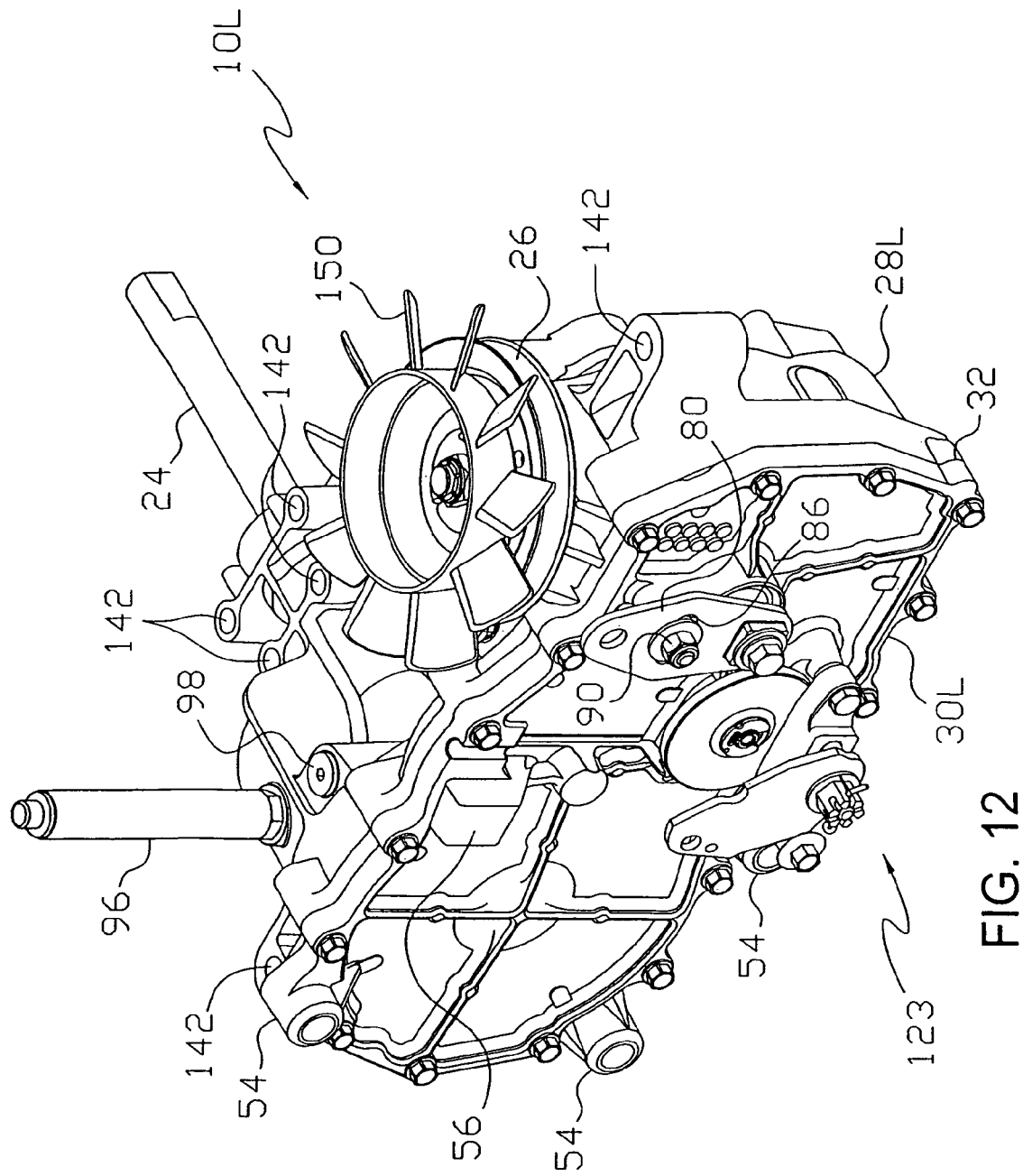
FIG. 12 illustrates a perspective view of the exemplary, zero-turn, hydrostatic transaxle of FIG. 10 further illustrating an exemplary, inboard, disk brake mechanism and inboard control arm mechanism.
Figure 13:
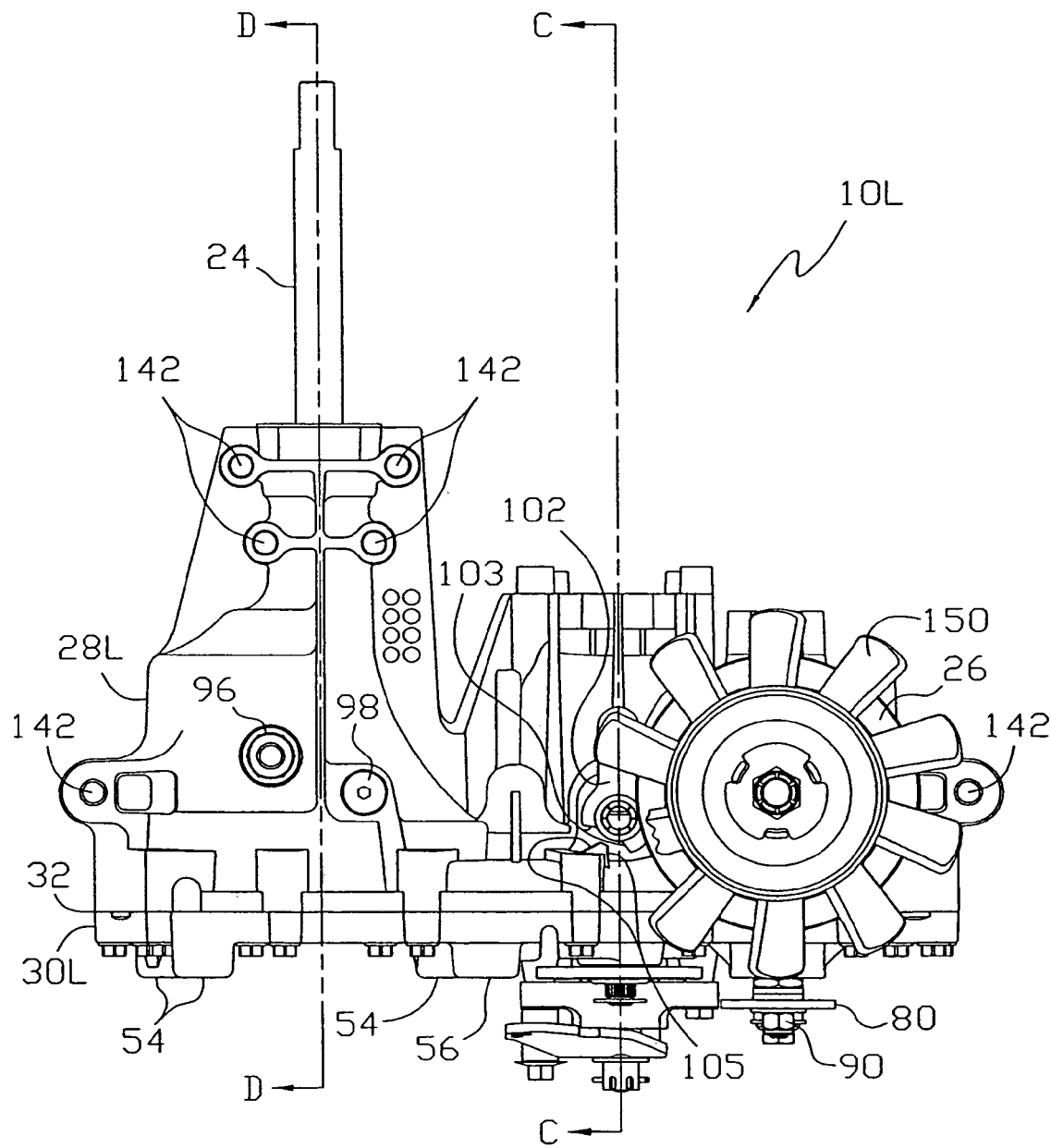
FIG. 13 illustrates a top view of the exemplary, zero-turn, hydrostatic transaxle of FIG. 12.
Figure 20:
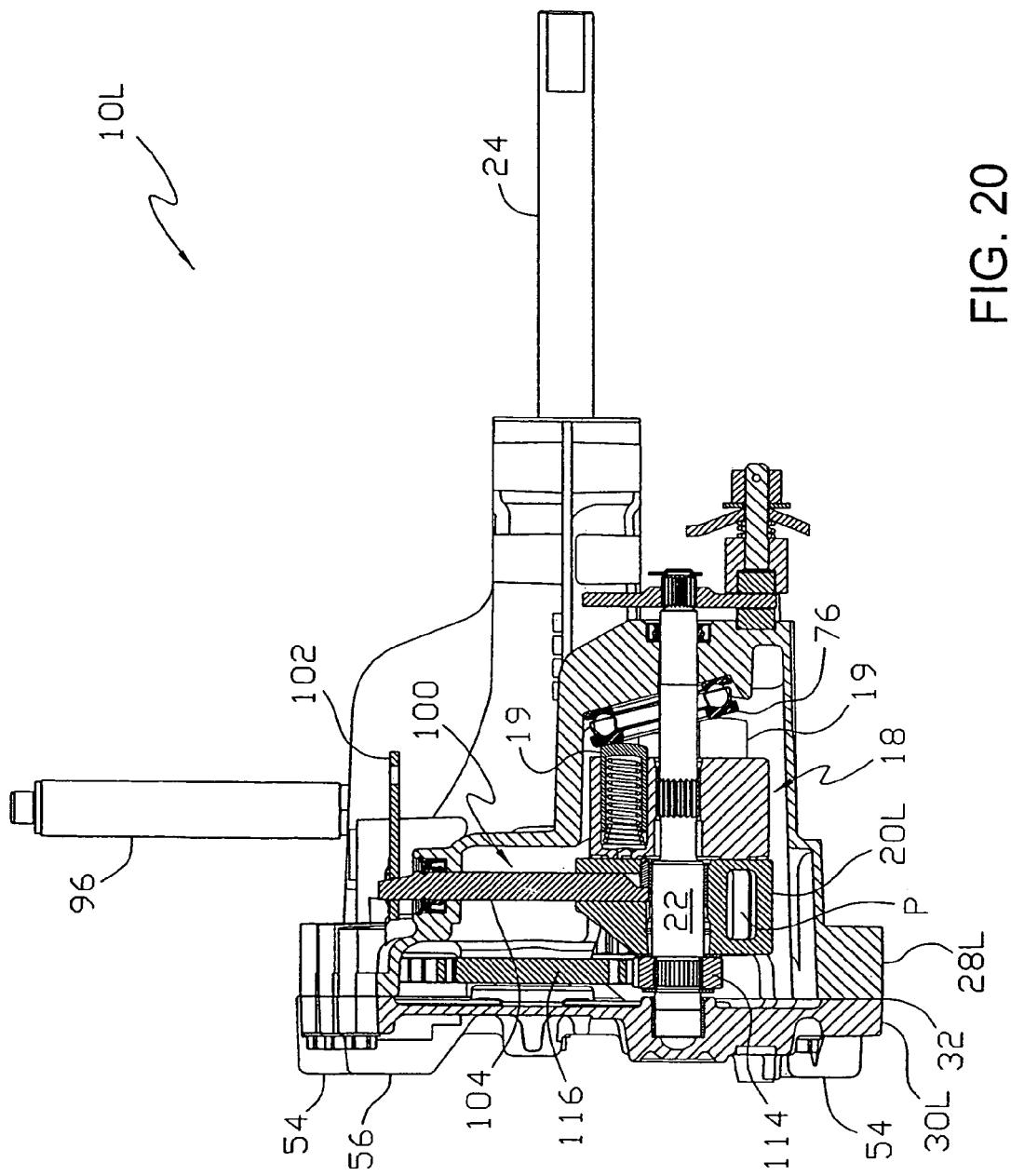
FIG. 20 illustrates a cross-sectional view of the exemplary, zero-turn, hydrostatic transaxle along line B—B of FIG. 15.
Figure 21:
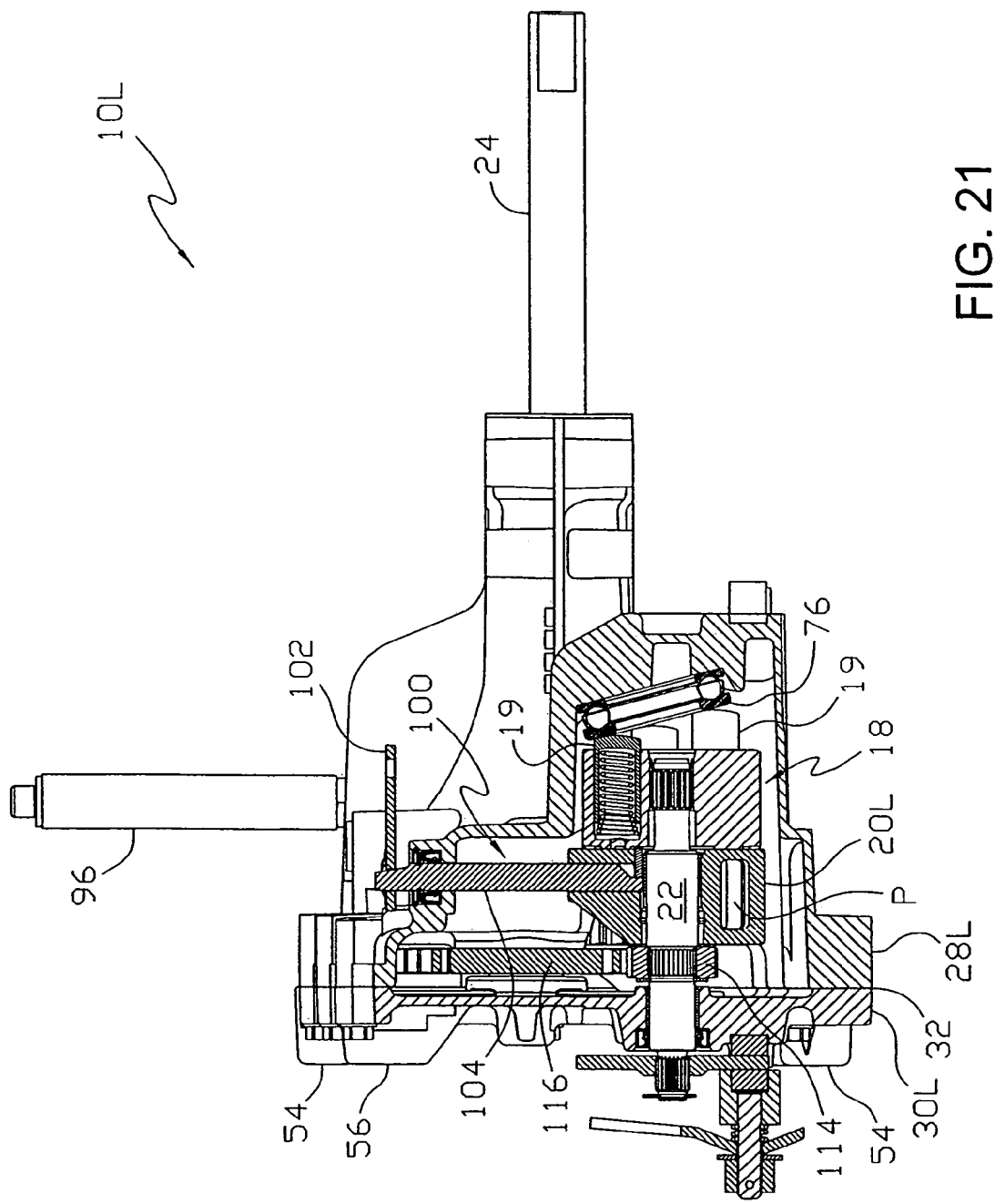
FIG. 21 illustrates a cross-sectional view of the exemplary, zero-turn, hydrostatic transaxle along line C—C of FIG. 13.

For allowing a brake mechanism 123 to be mounted to either the inboard or outboard side of the casing of the HZT 10, the motor shaft 22 can extend from the inboard side or the outboard side of the first casing section 28 as seen in FIGS. 20 and 21. It will be appreciated that the brake mechanism 123 may be a disc brake mechanism, as illustrated in FIG. 10, a cogged parking brake as illustrated in FIG. 11, or the like. As further illustrated in FIGS. 20 and 21, the motor shaft 22 may be provided with a configuration that depends upon whether the brake mechanism 123 is to be mounted on the inboard or outboard side of the casing. In this regard, three motor/brake shaft options are available. First, the motor/brake shaft could extend simultaneously from both the inboard and outboard side of the casing of the HZT 10 (not shown). Second, as illustrated in FIG. 21, the second casing section 30 can have an opening to accommodate the motor shaft 22 for inboard mounting thereof and the motor/brake shaft would not extend through the first casing section 28. Third, as illustrated in FIG. 20, the second casing section 30 can be used to cover and support one end of the motor/brake shaft while the opposite end of the motor/brake shaft extends from the first casing section 28 to the outboard side of the HZT 10. It will be appreciated that the first option increases the flexibility of the HZT 10 while the second and third options provide for a lower cost motor/brake shaft while eliminating the need for extra machining and seals.

Figure 5:
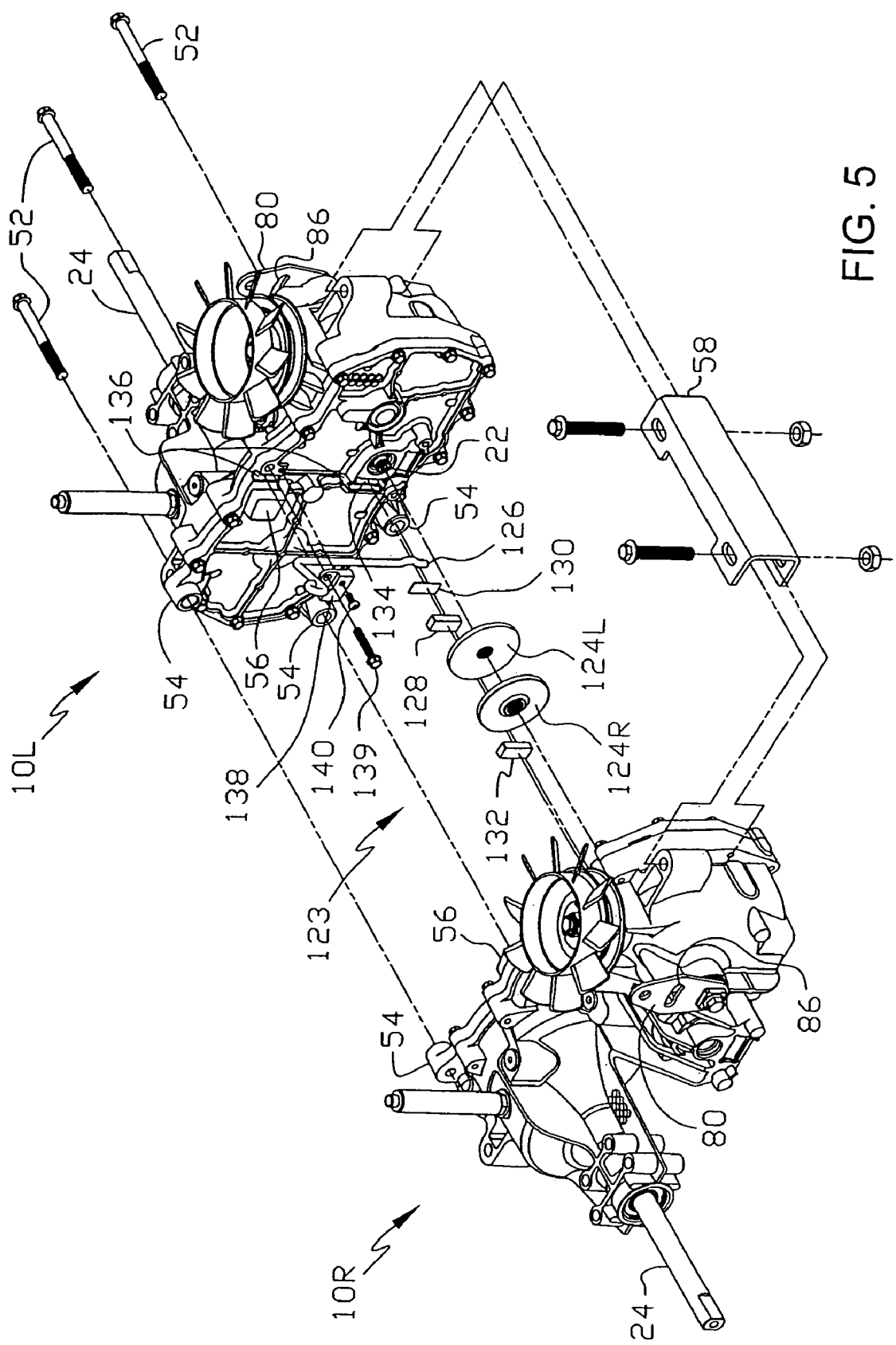
FIG. 5 illustrates an exploded view of the integrated, zero-turn hydrostatic transaxle of FIG. 3 particularly illustrating the exemplary, inboard, disk brake mechanism and attachment hardware.

When a brake mechanism is positioned on the inboard side of both the HZTs 10L and 10R, an integrated brake unit can be utilized as illustrated in FIG. 5. By way of example, the integrated brake unit may comprise a first brake disk 124L mounted to the motor shaft 22 of HZT 10L that is cooperable with a second brake disk 124R mounted to the motor shaft 22 of HZT 10R. The brake disks 124 may be provided with splines that are adapted to mate with corresponding splines formed on the motor shafts 22. Furthermore, when the HZTs 10L and 10R are mated, the spacing between the motor shafts 22 is not sufficient to allow the brake disks 124 to separate from their engagement with their respective motor shaft 22. It is contemplated that the spacing between the motor shafts 22 may be such that the brake disks 124 are in slipping engagement with one another when the brake mechanism is not activated.

To drive the brake disks 124 into frictional engagement with one another, a brake actuator 126, which can be a wire form, stamped metal, powdered metal piece, constructed using a cold heading process, etc., may be mounted to one of the HZT casings. Generally, the actuator 126 comprises an arm that is used to rotate the brake actuator 126 and a cam which, when the actuator 126 is rotated, is used to drive the brake disks 124R and 124L into frictional engagement. More specifically, the cam of the actuator arm 126 is used to drive a brake puck 128, via a protecting brake puck plate 130, into a first one of the brake disks 124 to, in turn, drive the first one of the brake disks 124 into the second one of the disk brakes 124. A second brake puck 132, associated with the second one of the disk brakes 124, is used to prevent movement of the second one of the disk brakes 124 under the influence of the driving first one of the disk brakes 124 to thereby maintain the frictional engagement. It will be appreciated that additional brake disks (not illustrated) may be utilized. It is to be further appreciated that the illustrated brake mechanism can also provide for the use of a brake yoke.

For maintaining the positioning of the brake pucks 128 and 132 within the brake mechanism, the casings of the HZTs 10 may include a grooved portion 134 sized and arranged to accept the brake puck. It will be appreciated that the positioning of the corresponding brake disk 124 functions to prevent the brake puck from dislodging from the groove 134 in which it is positioned. A further groove 136 may be provided in the casing of the HZT 10 in which the actuator 126 is positioned. This groove 136 may extend into and add to the grooved portions 134 to thereby allow the cam of the actuator 126 to be positioned behind the brake puck and brake puck plate 130. It is to be understood that the wire form, brake actuator 126 may be used in other configurations such as with a single or multiple disk brake and a brake yoke in place of a mating housing.

For maintaining the brake actuator 126 on the casing of the HZT 10, a retaining bracket 138 may be provided. The retaining bracket 138 may be attached to the casing by means of the fastener 139 used to mate the first and second casing sections 28 and 30. A separate fastener 140 adapted to mate with the second casing section 30 may also be utilized for this same purpose. The brake puck plate 130, the brake puck 128, and the brake disk 124 also function to keep the actuator 126 retained on the casing of the HZT 10 given the proximity of these components to one another and the mating features formed in the housing and shaft of the actuator 126.

To provide for the easy mounting of the HZT 10 to a vehicle frame, the first casing section 28 of each HZT 10 includes a plurality of fastener accepting openings 142. As illustrated in FIGS. 12–15, a pair of fastener accepting openings 142 can be positioned on opposing sides of the first casing section 28 and a further plurality of fastener accepting openings 142 can be positioned on the axle shaft horn of the first casing section 28. While illustrated with four fastener accepting openings 142 being formed on the axle shaft horn of the first casing section 28, it is to be appreciated that this is not intended to be limiting. Rather, any number of fastener accepting openings 142 can be formed and/or utilized in the attachment process. Still further, fastener accepting openings could be formed on a bracket 58 for use in mounting the HZTs 10L and 10R to a vehicle frame.

For use in cooling the EZTs 10L and 10R, a fan 150 may be mounted to one or both of the input shafts 12 adjacent to the pulley 26 as is illustrated in FIGS. 1 and 3. When two fans 150 are utilized, the diameters of the fans 150 need to be such that they do not contact each other while turning. Alternatively, if the fans 150 do have overlapping diameters, the fans 150 need to be vertically spaced to prevent blade contact.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A zero-turn hydrostatic transaxle, comprising:
   a first casing carrying a first hydraulic pump driven by a first input shaft and a first hydraulic motor driven by the first hydraulic pump through porting contained within a first center section;
   a first axle shaft driven by the first hydraulic motor;
   a second casing carrying a second hydraulic pump driven by a second input shaft and a second hydraulic motor driven by the second hydraulic pump through porting contained within a second center section;
   a second axle shaft driven by the second hydraulic motor; and
   wherein the first casing is joined to the second casing along an interface extending generally perpendicularly to the first axle shaft and the second axle shaft.

2. The zero-turn hydrostatic transaxle of claim 1, wherein the interface comprises a flat surface and a plurality of fastener bosses.

3. The zero-turn hydrostatic transaxle of claim 1, wherein a space is formed between the first casing and the second casing.

4. The zero-turn hydrostatic transaxle of claim 1, wherein the first casing forms a first cavity and the second casing forms a second cavity and a third casing is positioned between the first casing and the second casing to cover the first cavity and the second cavity.

5. The zero-turn hydrostatic transaxle of claim 1, wherein the first casing forms a first cavity and the second casing forms a second cavity, the first casing is joined to the second casing along a surface generally perpendicular to the first axle shaft and the second axle shaft, and a third casing section is positioned internal to the first casing and the second casing between the first cavity and the second cavity.

6. The zero-turn hydrostatic transaxle of claim 4, wherein fluid is permitted to pass between the first cavity and the second cavity by way of openings in the third casing.

7. The zero-turn hydrostatic transaxle of claim 5, wherein fluid is permitted to pass between the first cavity and the second cavity by way of openings in the third casing.

8. The zero-turn hydrostatic transaxle of claim 1, further comprising a bracket attaching the first casing and the second casing.

9. The zero-turn hydrostatic transaxle of claim 1, further comprising a rod attaching the first casing and the second casing.

10. The zero-turn hydrostatic transaxle of claim 3, further comprising a brake positioned in the space between the first casing and the second casing.

11. The zero-turn hydrostatic transaxle of claim 10, wherein the brake interfaces with a first motor shaft driven by the first hydraulic motor and a second motor shaft driven by the second hydraulic motor.

12. The zero-turn hydrostatic transaxle of claim 1, further comprising a plate disposed entirely within the interior of the joined first and second casings.

13. The zero-turn hydrostatic transaxle of claim 12, wherein the plate comprises a plurality of bearings to support at least one shaft positioned within the first casing and at least one shaft positioned within the second casing.

14. The zero-turn hydrostatic transaxle of claim 12, wherein the plate comprises at least one opening for permitting fluid to pass between the first casing and the second casing.

15. The zero-turn hydrostatic transaxle of claim 12, wherein the plate is positioned generally symmetrically with respect to the interface between the first casing and the second casing.

* * * * *